(12) United States Patent
Negi et al.

(10) Patent No.: US 9,875,396 B2
(45) Date of Patent: Jan. 23, 2018

(54) SPOOFING DETECTION IN IMAGE BIOMETRICS

(71) Applicant: Intel Corporation, Santa Clara, CA (US)

(72) Inventors: Ansuya Negi, Beaverton, OR (US); Scott Pfursich, Hillsboro, OR (US); David L. Graumann, Hillsboro, OR (US); Ranjit S. Narjala, Portland, OR (US); Rahuldeva Ghosh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 14/779,546

(22) PCT Filed: Mar. 27, 2015

(86) PCT No.: PCT/US2015/022924
§ 371 (c)(1),
(2) Date: Sep. 23, 2015

(87) PCT Pub. No.: WO2016/076912
PCT Pub. Date: May 19, 2016

(65) Prior Publication Data
US 2017/0193285 A1 Jul. 6, 2017

Related U.S. Application Data

(60) Provisional application No. 62/079,102, filed on Nov. 13, 2014, provisional application No. 62/079,095, (Continued)

(51) Int. Cl.
*G06K 9/00* (2006.01)
*G06K 9/52* (2006.01)

(52) U.S. Cl.
CPC ..... *G06K 9/00288* (2013.01); *G06K 9/00261* (2013.01); *G06K 9/00268* (2013.01); *G06K 9/52* (2013.01)

(58) Field of Classification Search
CPC .......... G06K 9/00288; G06K 9/00261; G06K 9/00268; G06K 9/52
See application file for complete search history.

(56) References Cited

U.S. PATENT DOCUMENTS

| 7,508,960 B1 | 3/2009 | Bolle et al. |
| 8,515,124 B2 | 8/2013 | Yoo et al. |

(Continued)

FOREIGN PATENT DOCUMENTS

| EP | 2546782 A1 | 1/2013 |
| EP | 2680192 A2 | 1/2014 |

(Continued)

OTHER PUBLICATIONS

"U.S. Appl. No. 14/779,540, Non Final Office Action dated Sep. 30, 2016", 17 pgs.

(Continued)

*Primary Examiner* — David F Dunphy
(74) *Attorney, Agent, or Firm* — Schwegman Lundberg & Woessner, P.A.

(57) ABSTRACT

System and techniques for spoofing detection in image biometrics are described herein. A sequence of images may be obtained from a camera; a first plurality of images in the sequence of images including a representation of a user body part, and a second plurality of images in the sequence of images including a representation of an environment of the user. A marker may be created for the representation of the body part. A feature of the environment of the user present during the second plurality of images may be identified in the sequence of images using a third group of circuits. A (Continued)

correlation between the marker and the feature of the environment in the sequence of images may be quantified to produce a synchronicity metric of the degree to which the marker and the feature of the environment correlate.

18 Claims, 20 Drawing Sheets

Related U.S. Application Data filed on Nov. 13, 2014, provisional application No. 62/079,082, filed on Nov. 13, 2014, provisional application No. 62/079,044, filed on Nov. 13, 2014, provisional application No. 62/079,036, filed on Nov. 13, 2014, provisional application No. 62/079,020, filed on Nov. 13, 2014, provisional application No. 62/079,011, filed on Nov. 13, 2014.

(56) References Cited

U.S. PATENT DOCUMENTS

| | | |
|---|---|---|
| 8,542,879 B1 | 9/2013 | Nechyba et al. |
| 8,856,541 B1 | 10/2014 | Chaudhury et al. |
| 9,202,105 B1 | 12/2015 | Wang et al. |
| 9,672,415 B2 | 6/2017 | Pfursich |
| 2006/0279726 A1 | 12/2006 | Galambos |
| 2007/0253604 A1 | 11/2007 | Inoue et al. |
| 2008/0192980 A1 | 8/2008 | Park et al. |
| 2010/0299530 A1 | 11/2010 | Bell et al. |
| 2013/0188840 A1 | 7/2013 | Ma et al. |
| 2013/0219480 A1* | 8/2013 | Bud .................. G06F 21/32 726/7 |
| 2014/0037156 A1 | 2/2014 | Cavallini |
| 2014/0307929 A1 | 10/2014 | Nechyba et al. |
| 2015/0161434 A1* | 6/2015 | Ross .................. G06K 9/00288 382/118 |
| 2016/0140405 A1 | 5/2016 | Graumann et al. |
| 2016/0335483 A1 | 11/2016 | Pfursich et al. |

FOREIGN PATENT DOCUMENTS

| | | |
|---|---|---|
| WO | WO-2013100898 A1 | 7/2013 |
| WO | WO-2014153462 A2 | 9/2014 |
| WO | WO-2016076912 A1 | 5/2016 |
| WO | WO-2016076914 A1 | 5/2016 |
| WO | WO-2016077590 A2 | 5/2016 |
| WO | WO-2016077590 A3 | 5/2016 |

OTHER PUBLICATIONS

"U.S. Appl. No. 14/779,540, Preliminary Amendment filed Sep. 23, 2015", 8 pgs.
"U.S. Appl. No. 14/779,540, Response filed Dec. 30, 2016 to Non Final Office Action dated Sep. 30, 2016", 11 pgs.
"International Application Serial No. PCT/US2015/022924, International Search Report dated Jul. 29, 2015", 5 pgs.
"International Application Serial No. PCT/US2015/022924, Written Opinion dated Jul. 29, 2015", 7 pgs.
"International Application Serial No. PCT/US2015/022934, International Search Report dated Jul. 30, 2015", 3 pgs.
"International Application Serial No. PCT/US2015/022934, Written Opinion dated Jul. 30, 2015", 9 pgs.
"International Application Serial No. PCT/US2015/060392, International Search Report dated May 24, 2016", 3 pgs.
"International Application Serial No. PCT/US2015/060392 Written Opinion dated May 24, 2016", 6 pgs.
Chakraborty, Saptarshi, et al., "An Overview of Face Liveness Detection", In: International Journal on Information Theory (IJIT), vol. 3, No. 2, (Apr. 30, 2014), 11-25.
"U.S. Appl. No. 14/779,540, Notice of Allowance dated Feb. 2, 2017", 11 pgs.
"U.S. Appl. No. 14/865,763, Non Final Office Action dated May 25, 2017", 11 pgs.
U.S. Appl. No. 14/779,540, filed Sep. 23, 2015, Facial Liveness Detection In Image Biometrics.
U.S. Appl. No. 14/865,763, filed Sep. 25, 2015, Preventing Face-Based Authentication Spoofing.

* cited by examiner

SPOOFING DETECTION IN IMAGE BIOMETRICS

CLAIM OF PRIORITY

This patent application is a U.S. National Stage Application under 35 U.S.C. 371 from International Application Number PCT/US2015/022924, filed Mar. 27, 2015, which claims the benefit of priority to all of: U.S. Provisional Application Ser. No. 62/079,011, titled "LIVENESS DETECTION IN FACIAL RECOGNITION WITH SPOOF-RESISTANT PROGRESSIVE EYELID TRACKING," and filed Nov. 13, 2014; U.S. Provisional Application Ser. No. 62/079,020, titled "FACIAL SPOOFING DETECTION IN IMAGE BASED BIOMETRICS," and filed Nov. 13, 2014; U.S. Provisional Application Ser. No. 62/079,036, titled "COVERT LIVENESS DETECTION SYSTEM AND METHOD," and filed Nov. 13, 2014; U.S. Provisional Application Ser. No. 62/079,044, titled "FACIAL SPOOFING DETECTION FACILITATION," and filed Nov. 13, 2014; U.S. Provisional Application Ser. No. 62/079,082, titled "SCREEN REFLECTION ANTI-SPOOFING SYSTEM AND METHOD," and filed Nov. 13, 2014; U.S. Provisional Application Ser. No. 62/079,095, titled "EYELID TRACKING FOR BIOMETRIC LIVE-NESS TEST," and filed Nov. 13, 2014; and U.S. Provisional Application Ser. No. 62/079,102, titled "SPOOFING DETECTION IN IMAGE BASED BIOMETRICS," and filed Nov. 13, 2014; the entirety of all are hereby incorporated by reference herein.

TECHNICAL FIELD

Embodiments described herein generally relate to biometric computer authentication and more specifically to spoofing detection in image biometrics.

BACKGROUND

Facial recognition for authentication purposes allows a user to use her face to authenticate to a computer system. Generally, the user's face is captured and analyzed to produce and store a feature set to uniquely identify the user during a set-up process. When the user wishes to use her face in a future authentication attempt, a camera will capture a representation of the user's face and analyze it to determine whether it sufficiently matches the stored feature set. When a sufficient match between a current image capture of the user's face and the stored feature set is made, the user is authenticated to the computer system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Some current facial recognition solutions are prone to be spoofed (e.g., faked) by a photo, for example, on a phone, tablet, etc. For example, a person may acquire a picture of a user, for example, via a tablet camera or from an employee's social media profile, display that picture on a device and hold the device in front of a camera being used to capture a facial representation to authenticate the user. Thus, the person has spoofed the user's real face to circumvent the face-based authentication process.

To prevent facial spoofing, some types of anti-spoofing techniques may be employed (alone or in combination), such as asking users to perform certain tasks (e.g., invoking dynamic user involvement that may be hard to predict to complicate spoofing) or analyzing the context (e.g., environment) of the image capture to determine whether the captured image represents a "live" user. Both techniques may distinguish between a live user and a facsimile, but merely asking for more user input (e.g., in the form of specific tasks, assuming body positions, etc.) may present some user experience challenges (e.g., how to represent the request, difficulty for user's to follow the request, excessive time in performing the requests, etc.). Analyzing the context in which the image was captured, however, may avoid the user experience challenges associated with a more interactive technique. Further, techniques may be employed to induce a user behavior without a specific instruction. For example, simply presenting an interesting object that is moving will capture a user's attention without the user having to be told to track the object. Such techniques may augment environmental observation without burdening the user.

Mechanisms and techniques for analyzing authentication context are described below. As used herein, the context does not include such contexts as the time of day, location, or other discernable contexts, but rather the environmental contexts observable from a camera or other sensor on the authentication device or introduced to the user (e.g., a moving target on the screen). Also, although a technique may be described below to identify a spoofing attempt (e.g., the use of a facsimile instead of a real biometric component to authenticate a user), the same techniques may be used to identify a live biometric component. Thus, even in environments in which spoofing is not a concern—such as in a family home whether authentication may be primarily used to identify users for application or environment customization rather than access security—identifying a live face may reduce processing overhead or negative authentication attempts by avoiding authentication processing on inanimate representations of body parts (e.g., a doll held in a child's arms).

Figure 1:
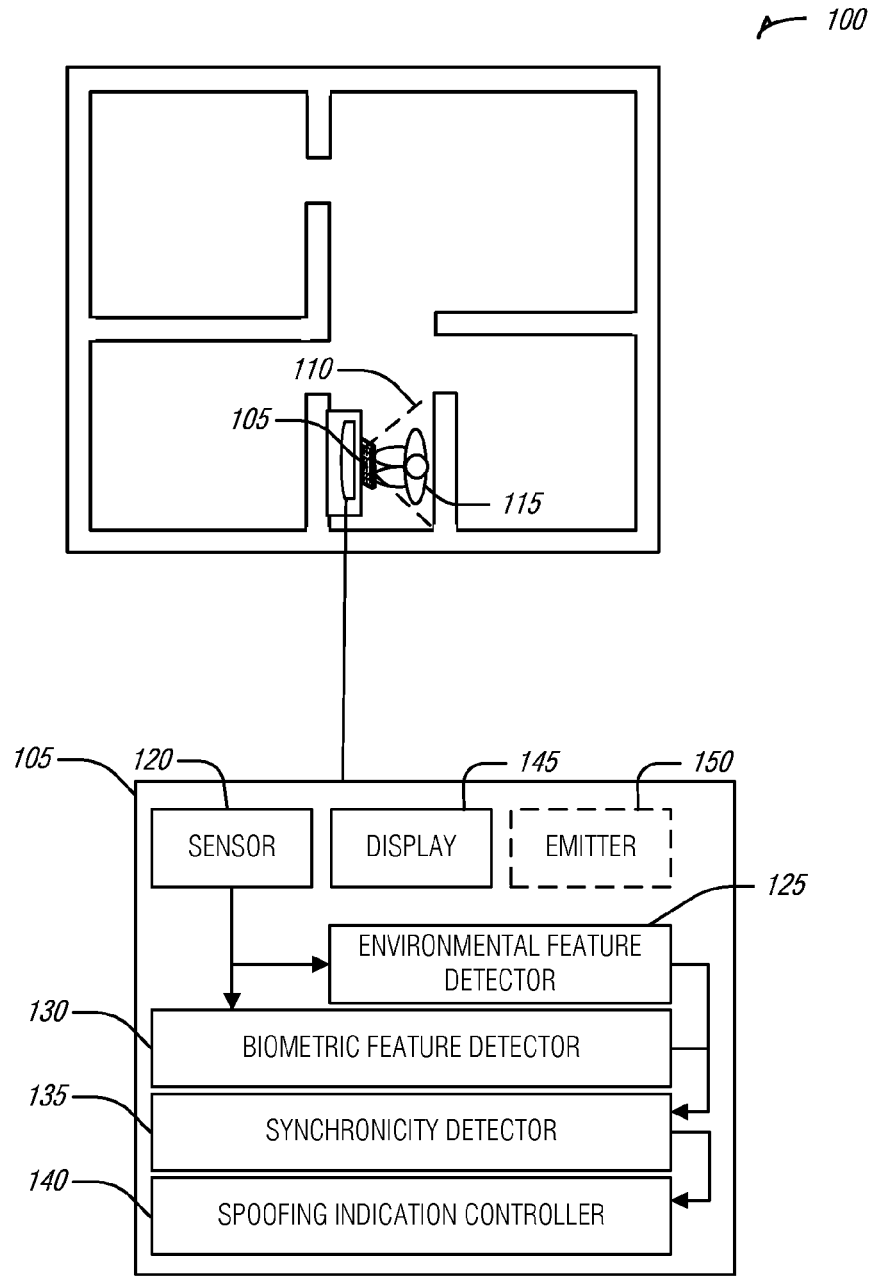
FIG. 1 is a block diagram of an example of an environment including a system for image biometrics, according to an embodiment.

FIG. 1 is a block diagram of an example of an environment 100 including a system 105 for image biometrics, according to an embodiment. The system 105 may include a sensor 120 (e.g., a digital camera or video recorder, a non-visible light detector, etc.), a display 145 (e.g., a screen, monitor, visible light emitter, etc.), optionally an additional emitter 150 (e.g., an infrared (IR) or other non-visible or visible light spectrum emitter), an environmental feature detector 125, a biometric feature detector 130, a synchronicity detector 135, and a spoofing indication controller 140. The spoofing indication controller 140 may also be known as a liveness indication controller when the analysis is shifted from identifying a spoofing attempt to identifying a live body part (e.g., face). The system 105 may also include an authentication controller (not shown) to actually perform an authentication of a user 115. Each of these components is implemented in computer hardware, such as a circuit set, as described below with respect to FIG. 20.

The system 105 may obtain a sequence of images from the sensor 120. The sequence of images includes a first plurality of images (e.g., frames, pictures, etc.) including a representation of a user body part (e.g., face, finger, etc.). As used herein, the representation of the body part is the sensor representation of the actual part. Thus, a digital image of the user's face is the representation of the face. The sequence of images also includes a second plurality of images that include a representation of an environment of the user 115. This first plurality and second plurality of images may fully or partially overlap (e.g., include the same images or other sensor readings). As illustrated, the sensor 120 is a camera with a field of view 110 that encompasses the user 115 as well as some other objects, such as the background of the user 115. In an example, the sequence of images may be processed to reduce noise (e.g., application of a filter). In an example, the sequence of images may be processed to reduce color information. In an example, the color information may be reduced to one bit per pixel (e.g., black and white).

In an example, the sequence of images may be captured as the user 115 approaches the sensor 120. For example, the relevant images in a continuous stream may be bounded by the identification of the user 115 approaching the sensor 120, or activating the sensor 120 upon an additional sensor (not shown) indicating that the user 115 is approaching (e.g., via device positioning or location based services, a motion detector, etc.). Such early activation (e.g., before an authentication request is made) may provide additional context information (e.g., relative motion between the user 115 and other environmental components) that may be used in the techniques described below.

The biometric feature detector (BFD) 130 may obtain the sensor 120 data and create a marker for the representation of the body part. As used herein, the marker is a transformation or alternative representation of the body part and is specific to the liveness, or spoofing test being applied. For example, a location of the eyes in a representation of a face may be the only positioning information needed to ascertain a location of the face in the image. Accordingly, a marker may be a point representing the center of the eyes.

In an example, the marker may be a measurement of the body part based on a depth measurement (described below). Such a measurement may be performed by scaling the pixel representation of the body part by the depth associated with the area in which the body part was detected. Such a measurement may not directly translate to the real-life size of the body part, but more distant objects will be scaled greater than near objects. In an example, an optical characteristic of the sensor 120 may be used to scale the body part using the depth measurement. Although such a mechanism may be more complicated that the simple scaling mechanism it is likely to result in a more accurate determination of the size of the corresponding body part. In an example, the measurement of the body part based on the depth measurement and the representation of the body part may be determined by extrapolating the size of the body part using the depth image and a dimension (e.g., length, width, height, volume, etc.) of representation of the body part. That is, a single dimension may be scaled rather than scaling the entirety of the body part representation. In an example, the measurement may include a depth map of the body part. Such a map may provide contour details that may be used to correlation purposes to a model of the body part maintained by the system 105.

In an example, the marker may be a line between the eyes in the representation of the body part. In an example, the marker may be a point in the middle of the line. In an example, the marker may be a shape centered at the centroid of the representation of the body part.

In an example, the BFD 130 may track a gaze of an eye from the representation of the body part. Thus, the BFD 130 may determine a direction that the eyes are looking at any given moment. In an example, this tracking occurs across a plurality of the images in the sequence of images. In an example, the gaze of the eye may be determined by measuring the amount of iris visible for the eye. In an example, a calibration session may be used to calibrate the eye tracking by the BFD 130. In an example, the calibration session may include presenting a moving prompt. A second (e.g., different) sequence of images may be captured during the presentation of the moving prompt. A correspondence of the user's 115 eyelid positions to the moving prompt may be measured from the second sequence of images. The measured correspondence may then be used as the spoofing indication attempt threshold described below.

In an example, the marker may be a measured eye blinking sequence. That is, the blink of one or more eyes may be tracked, with characteristics of the eye measured throughout the blink.

The environmental feature detector (EFD) 125 may obtain the sensor 120 data and identify a feature of the environment of the user 115 that is present during the second plurality of images in the sequence of images. In an example, identifying the environmental feature may include emitting a pattern into the environment, for example, using the display 145 or the emitter 150. A uniform pattern is the same (within tolerance) across space and time. Such a uniform pattern may include a spotlight, or other illuminator. A non-uniform pattern varies either in space or time, the wavelength or amplitude of the emission. This variance is by design, rather than by accident. For example, the wave pattern depicted in FIG. 5 is a non-uniform pattern whereas a globe-shaped emitter, such as a light bulb, is a uniform pattern emission even though there may be variances in the emission.

Pattern emission may serve several useful details about the environment without burdening the user 115 with tasks. For example, the emission may be used to determine distances to environmental components. Further, some surfaces of those environmental components may have different reflection characteristics that may be used to distinguish between a device screen, for example, and a live face. In an example, the pattern may be uniform. In an example, the pattern may be non-uniform. In an example, the pattern may be in the visible light spectrum. In an example, the pattern may be in a non-visible light spectrum. In an example, the non-visible light spectrum of the pattern includes IR light.

In an example, the pattern may be emitted in a non-uniform pattern in a visible light spectrum. In an example, the non-uniform pattern is a moving pattern. A moving pattern involves the variation in wavelength or amplitude over an area in time such that it appears to the user 115 that a portion of the pattern moves from one place to another. For example, a black horizontal bar traversing from the top to the bottom of the display 145. In an example, the pattern is emitted in a non-visible spectrum, for example by the emitter 150. In an example, the non-visible spectrum emission is an IR emission.

In an example, the feature of the environment is a depth measurement of the body part derived from the pattern. For example, the time-of-flight of the emission reflecting off of a surface may be used to measure depth, or distance, from the emitter to the surface. Other mechanisms, such as emitting a known pattern and ascertaining variances in the pattern's reflection, may also be used. For example, a pattern of dots may be emitted. The distance between the reflected dots will be greater for closer objects and lesser for dots reflecting off of distance objects. Similar analysis may be performed in either the visible or non-visible light spectrums. In the visible spectrum, the pattern may be a background to the authentication screen. In an example, the visible light spectrum pattern may include high contrast elements, such as black on white or white on black.

In an example, the feature of the environment may be a reflectivity of the pattern in an area of the environment containing the marker. Devices and inks often absorb IR light but reflect, in a relatively uniform manner, visible light. Conversely, for example, the human face reflects IR and is a poor reflector of visible light. Moreover, the flat surface of a device or of paper and the contoured nature of most body parts used for authentication result in different reflection characteristics even if both reflect the emission.

In an example, the feature of the environment may include a convex hull of points on edges detected in the plurality of images. That is, in analyzing detectable edges in the sequence of images, the edges may suggest an enclosing shape. The convex hull is constructed when the edges intersect, or conform to expected intersections (e.g., do not actually intersect but come close enough given a shape model) and the intersected edges enclose an area. In an example, the edges may be compared to a catalog of device edge configurations to determine whether the edges represent a known device. In this example, the convex hull of points is based on a physical configuration of the known device. In an example, the edges are moving edges. That is, non-moving edges are excluded from the convex hull construction. This example, recognizes the likelihood that a spoofing device is mobile within the field of view 110 as opposed to, for example, a piece of art hanging in an office.

In an example, the feature of the environment may be a background proximate to the body part. As used herein, proximate denotes an area that borders the body part, includes separately identifiable features, and is not part of the body part. Proximity may be based on a threshold distance. Thus, elements bordering the body part in the sequence of images out to a threshold distance are considered proximate to the body part in the real-world scene.

In an example, proximity may include objects that intersect the representation of the body part. Thus, a detected credenza that touches the representation of the body part may be considered proximate. Thus, a specific threshold distance need not be applied as long as the object touches the body part in the sequence of images. It is noted that the "touching" need not be actual touching in the real-world composition because an object passing behind the body part will appear to touch the representation of the body part when flattened to a two-dimensional representation in the sequence of images.

The proximity between the background and the representation of the body part simply addresses the issue of the authentication environment background also being in the field of view with the spoofing device. Thus, although a background will surround the body part as displayed by the device, the authentication environment background may also be detectable. However, the feature of importance here is the background characteristics around the body part that would be difficult to vary with respect to the body part as the device is moved.

In an example, the environmental feature is model of an eye blinking sequence. In this example, the environmental feature is a function of the environment but not directly observable from the environment itself. The eye blinking model provides a basis to which a measured eye blinking sequence may be compared. The eye blinking model provides expected characteristics of a live blink by the user 115. Different eye blinking models may be provided based on environmental conditions, such as lighting conditions likely to increase a blink rate, or other characteristic, of the user's 115 blink. In an example, the model may define an eyelid sequence corresponding to eyelids that move in opposite directions as an abnormal eyelid sequence.

The synchronicity detector (SD) 135 may quantify a correlation between the marker and the feature of the environment in the sequence of images to produce a synchronicity metric of the degree to which the marker and the feature of the environment correlate. Thus, the marker and the environmental feature are compared to determine how close they are. A value is then assigned to this closeness. The value may be one of several discrete values, a real representation (e.g., a numerical representation to the precision allowed by the computing hardware), a binary representation, etc. The specific quantification (e.g., measure of closeness) will depend on the specific environmental feature and marker used.

In an example, where the environmental feature is a depth measurement to the body part and the marker is a measurement of the body part, the correlation may be the degree to which the measurement of the body part conforms to a live body part at the depth measurement. Thus, a range of acceptable body part sizes may be maintained. If the body part measurement falls outside of the maintained range, the degree to which this occurs may be synchronicity metric. In an example, the synchronicity metric may be a binary indication as to whether or not the measurement falls within the range.

In an example, the correlation between the feature of the environment and the marker may be the degree to which the area reflects the pattern. For example, in an IR emission, a device will not be expected to reflect much IR light. Thus, there should be a higher correlation between the area in which the body part was discovered and the reflection characteristic if the body part is displayed by the device. Conversely, if the body part is real, then a lower correlation may be assigned. The direction of the correlation, e.g., high or low, may be reversed if a device is expected. In an example, the pattern is moving, and the degree to which the area reflects the pattern includes determining whether a specified feature of the patter moved an expected distance. For example, if a straight light moving pattern is projected on a flat surface, the progress of the line in the reflection should be uniform. However, if the pattern were moving across a contoured surface, such as a face or fingertip, the pattern would be distorted and thus would not move the expected distance. In an example, the degree to which the area reflects the pattern may include the homogeneity of reflection of the light.

In an example, where the environmental feature includes the convex hull described above, the correlation between the marker and the feature of the environment may be the degree to which marker is found within the convex hull. Thus, a greater correlation may be ascribed to the marker being within the convex hull, and a lesser correlation may be ascribed to the marker being outside the convex. Additional gradients in the correlation may be ascribed given relative distances between the marker and an edge of the convex hull. Thus, a lesser correlation may be ascribed to a marker father outside the convex hull than a second marker that is still outside the convex hull yet closer to the hull.

In an example, the SD 135 may measure the degree to which a tracked gaze of an eye tracks a moving pattern displayed on the display 145. Thus, an instinctual tendency for a person to visually track a moving prompt may be exploited to determine liveness without asking the user 115 to perform a specific task. In this example, a live person would be expected to track the moving pattern, or a portion thereof, while a facsimile would have difficulty simulating such tracking.

In an example, where the environmental feature is a background proximate to the body part, the correlation may be the degree to which the background proximate to the body part in the sequence of images moves with the marker. Thus, if the proximate background moves with the representation of the body part, it may be assumed that the background is part of a picture including the body part and thus a spoofing attempt. Conversely, if the proximate background remains still while the representation of the body part moves, it may be assumed that the corresponding body part belongs to a live being. This correlation measurement involves movement of the body part across the background. Although this often happens naturally, it may also be facilitated. For example, a target may be displayed on the display 145 to the user 115. Such a target is not a specific instruction to the user 115, but rather relies on the user's 115 natural inclination to move towards the target.

In an example, the target may be displayed along with a representation of the body part to the user 115. In this example, the target is displayed in a different position than the representation of the body part. Thus, the user 115 will be inclined to move so as to place the body part on the target. It is not important that the user actually reach the target, but rather that some movement occurs. In an example, the target is an outline of a shape sized such that the representation of the body part fits inside the shape when a center of the shape coincides with a center of the representation of the body part. For example, the outline of a circle may be the target, the circle being large enough to fit a representation of the user's 115 face inside of it. Thus, the user 115 may be inclined to try and place her face inside the circle. In an example, the shape may be a rectangle, an ellipse, a star, or a triangle. In an example, the target is a shape sized such that the representation of the body part does not fit inside the shape when a center of the shape coincides with a center of the representation of the body part. In an example, the target may be an icon, shape, point, or other differentiating visual element.

In an example, the target being in a different position than the representation of the body part may include displaying the target at an offset from the body part. In an example, the offset may be determined by a relative motion model defining a motion parameter of the body part to distinguish between foreground objects and background objects in a field of view 110 of the sensor 120 capturing the sequence of images. The relative motion model thus indicates the amount of motion that will allow a differentiation between foreground objects, like the body part, and background objects. In an example, the relative motion model may include a threshold of movement sufficient to distinguish between foreground objects and background objects.

In an example, the representation of the body part may be a symbol obfuscating at least one feature of the body part from the sequence of images. In an example, the symbol may be an illustration of the body part. Obfuscating the representation of the body part or other portions of the displayed target scenario provides benefits to the manipulations that may be performed in showing motion of the representation of the body part to the target described below. Further, such obfuscations may make it difficult for a malicious person to precisely ascertain what is being monitored by the system 105 and thus harder to create a realistic facsimile for spoofing purposes.

In an example, the body part may be a face, and the direction of the offset is the inverse of the orientation of the face. Thus, the target is placed in a direction forward of the user's 115 forward motion. This may result in a more intuitive motion from the user's 115 perspective. In an example, the distance of the offset from the representation of the body part may not be coupled to a pixel position difference between the body part captured in the sequence of images and the target. In an example, displaying the representation of the body part may include modifying the motion of the body part using the relative motion model. This modification may include speeding up or slowing down the movement at various points throughout the moving. Thus the target may be shifted, grown, shrunk, etc., or the representation of the body part may be translated within the displayed image. This manipulation may elicit a greater motion from the user while indicating progress in reaching the target to the user 115. This technique may be easier when the scene is obfuscated to the user 115 as described above.

In an example, where an eye blinking sequence is measured, the correlation may be the degree to which the measured eye blinking sequence conforms to the eye blinking model. In this example, a strong correlation indicates a live person whereas a poor correlation indicates a spoofing attempt. In an example, the degree to which the measured eye blinking sequence conforms to the model may be determined by processing, through a pattern recognizer, the series of respective scores calculated from a percentage of the eye unobstructed by the eyelid. In this example, the pattern recognizer checks the series of respective scores for at least one of an abnormal eyelid sequence or an abnormal blink sequence based on the model. In an example, the pattern recognizer may serially check the abnormal blink sequence after verifying that the eyelid sequence is normal. That is, the eyelid sequence check is performed first. If it passes, then the abnormal blink sequence is checked.

The spoofing indication controller (SIC) 140 may provide a spoofing attempt indication in response to the synchronicity metric being beyond a threshold. In an example, the SIC 140 may provide a liveness indication or otherwise classifies a representation of a body part as live in addition to, or instead of, providing the spoofing indication. In an example, the authentication attempt may be denied with the spoofing attempt indication. In an example, the spoofing attempt indication may be combined with other spoofing attempt indications to determine whether to deny the authentication attempt. For example, each spoofing attempt indication may be a weighted value. Adding the weighted values results in a total that is compared to a threshold to determine whether an active spoofing attempt is being made; authentication being denied during an active spoofing attempt. In an example, the spoofing indication is provided to another system component to be used in the authentication process.

In an example, where the reflectivity of the area in the environment is the basis for the synchronicity metric, the threshold may define a minimum reflectivity of the pattern. That is, if the device is expected to reflect the emission, then a spoofing attempt indication is made when the area reflects enough (e.g., more than the threshold). In an example, the minimum reflectivity includes a minimum reflectivity of a specified feature of the pattern. Such features may include a visual feature (e.g., a portion of emitted lines or shapes), a wavelength, etc.

In an example, where the reflectivity of the area in the environment is the basis for the synchronicity metric, the threshold may define a maximum reflectivity of the pattern. That is, if the device is not expected to reflect the emission (in the case of IR light), then a spoofing attempt indication is made when the area does not reflect enough light (e.g., less than the threshold). In an example, where the pattern is in a non-visible light spectrum, the degree to which the area reflects the pattern includes the homogeneity of reflection of the non-visible light. In an example, the degree to which the area reflects the pattern may include a brightness of the reflection of non-visible light, a bright reflection corresponding to a high reflectivity. In this example, a highly reflective surface in the non-visible spectrum will not be considered a spoofing device. Rather, a device would be expected to have a low reflectivity that is homogenous.

In an example, the SIC 140 may provide a spoofing indication attempt in response to the degree to which a tracked eye gaze tracks a moving pattern provided in the display 145. As noted above, if the degree is low, indicating poor or non-existent tracking, it is likely that the corresponding body part is not real. Conversely, a high degree of tracking indicates that a live person is being represented in the representation of the body part.

In an example, where the correlation is the degree to which the proximate background moves with the representation of the body part, the SIC 140 may provide the spoofing indication when the degree is low. In an example, the spoofing attempt indication may be made before the representation of the body part reaches the target. That is, the spoofing attempt indication does not rely on the user actually moving into the target, but rather after a requisite amount of motion has occurred to correlate the relative motion of the representation of the body part to the proximate background.

FIGS. 2-17 illustrate various features of the embodiments described above with respect to FIG. 1. Generally, one or more of the figures illustrate the interaction between the EFD 125, BFD 130, and SD 135 with respect to specific embodiments.

Figure 2:
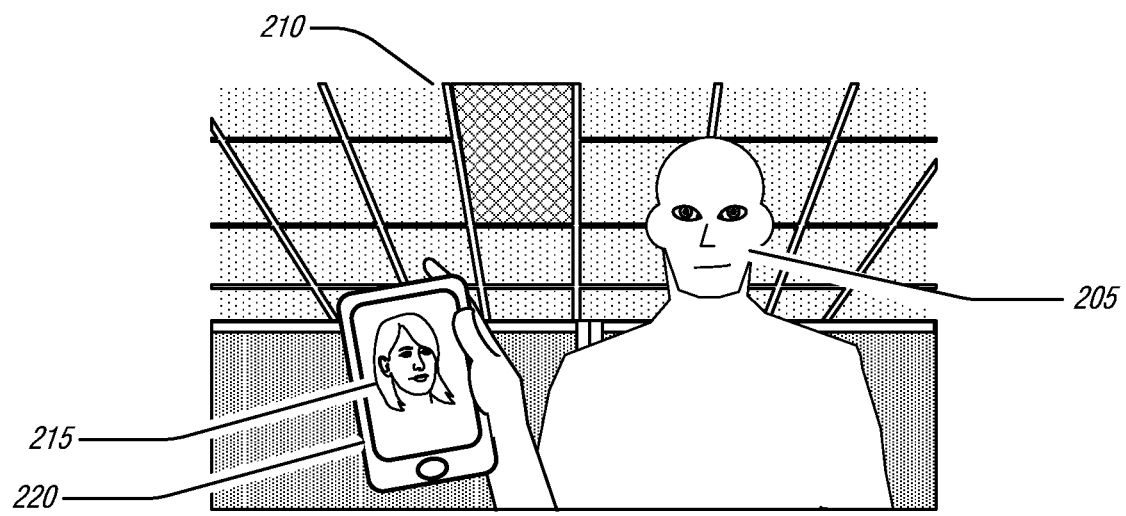
FIG. 2 is an example of a scene visible by a camera for image biometrics, according to an embodiment.

FIG. 2 is an example of a scene 210 visible by a camera for image biometrics, according to an embodiment. FIG. 2 illustrates environmental components, such as a representation 205 of the user 115, a device 220, a face 215 on the device 220, and other background components. The scene 210 is the pictorial representation of the components within the field of view 110 illustrated on FIG. 1. This scene 210 includes the elements used in most embodiment examples illustrated in FIGS. 3-13.

Figure 3:
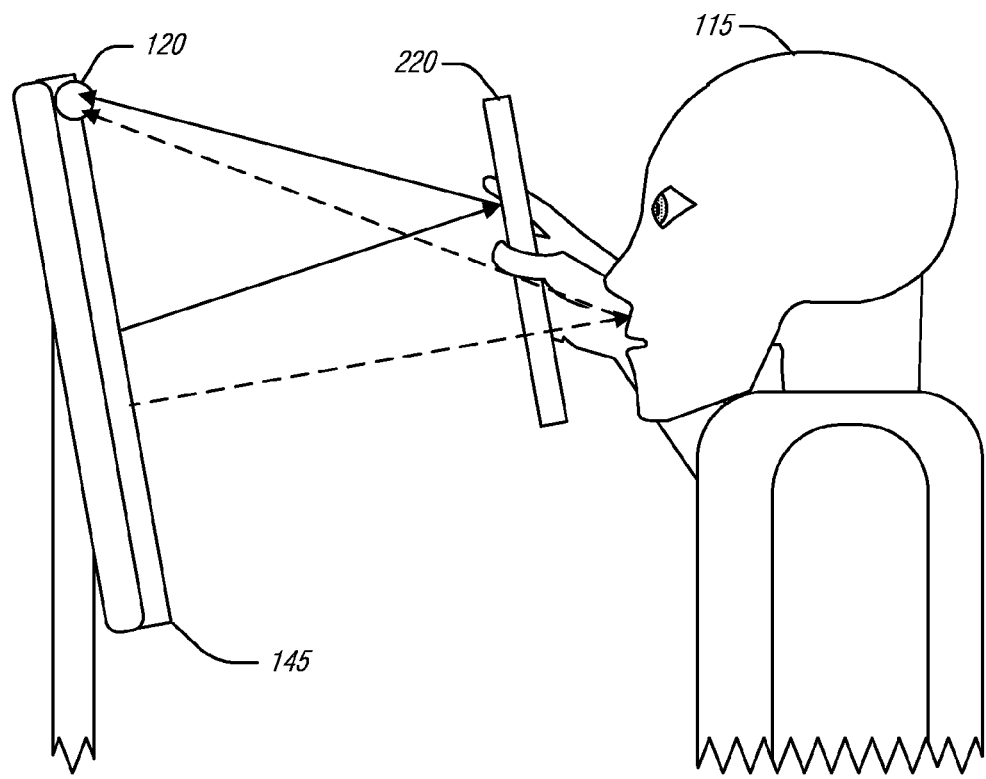
FIG. 3 is a diagram of an example arrangement of system and scene components for image biometrics, according to an embodiment.

FIG. 3 is a diagram of an example arrangement 300 of system and scene components for image biometrics, according to an embodiment. As noted above, emitting light into the environment may produce useful measurements to determine environmental features. The arrangement 300 includes the sensor 120 and the display 145 for emission purposes. In an example, the emitter 150 may be used in addition to the display 145, or alone, to emit light into the environment. In the arrangement 300, the user 115 is holding the device 220. The solid arrows indicate the reflection of light from the device 145 to the sensor 120 after being emitted by the display 145. Similarly, the dashed arrows indicate the reflection of light from the user 115 to the sensor 120 after being emitted.

Figure 4:
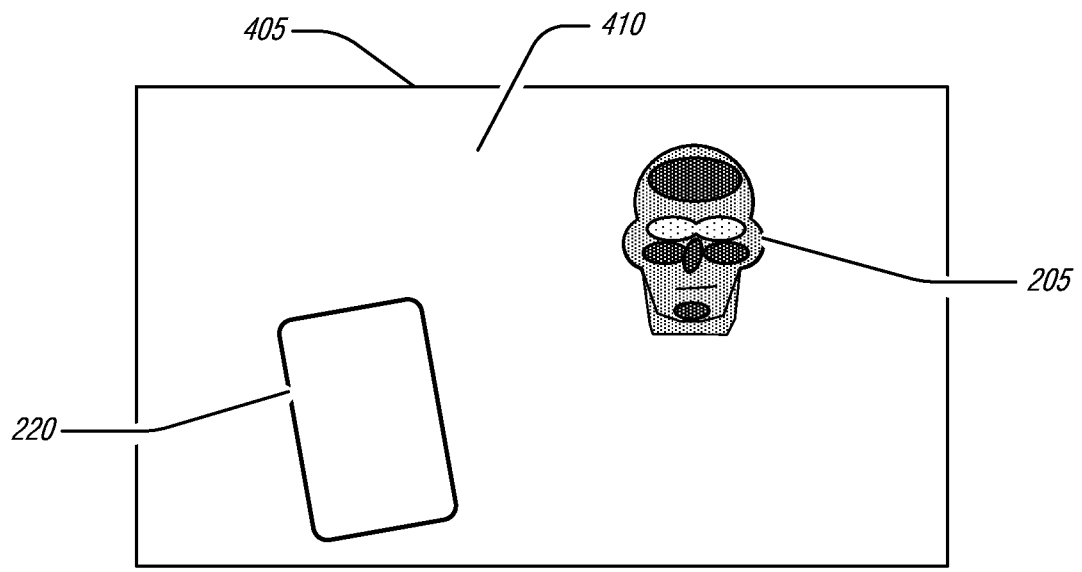
FIG. 4 is a diagram of an example of scene reflectivity to non-visible light, according to an embodiment.

FIG. 4 is a diagram of an example of scene reflectivity 405 to non-visible light, according to an embodiment. As illustrated, the darker the shading, the greater the level of non-visible light reflectivity. Thus, the device 220 is homogenously reflecting light at a level similar to the background 410 and the representation 205 of the user 115 indicates a non-homogenous reflection of the light greater than the background 410 levels. As noted above, the display of device 220 and many commercial inks generally reflect IR light poorly whereas human skin does not. Combining the scene reflectivity 405 with the scene 205 allows the reflectivity in a region to facilitate determination as to whether the representation 205 is live, by finding non-homogenous reflectivity at the same location in the sequence of images, or a facsimile face 215 by noting a homogenous reflection, or lack of reflection, at the location of the device 220.

Figure 5A:
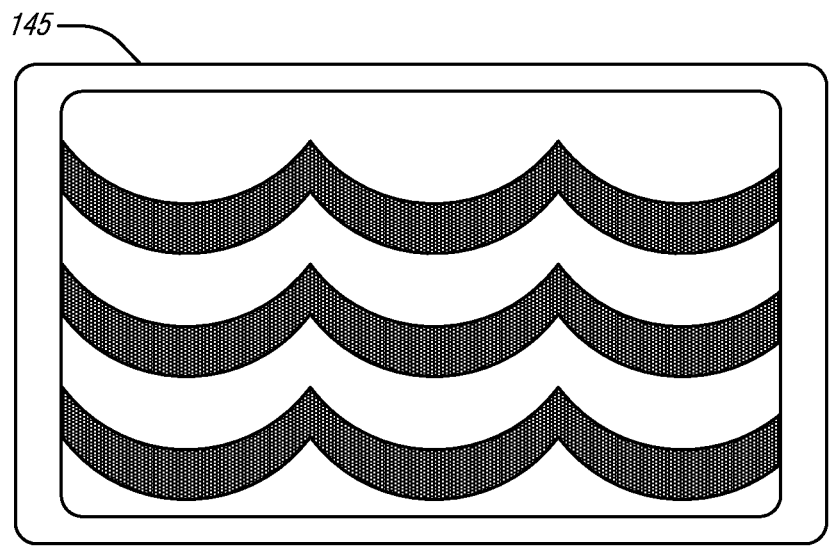
FIG. 5A is an example of an emitted pattern and FIG. 5B is an example of scene reflectivity under the emitted pattern, according to an embodiment.
Figure 5B:
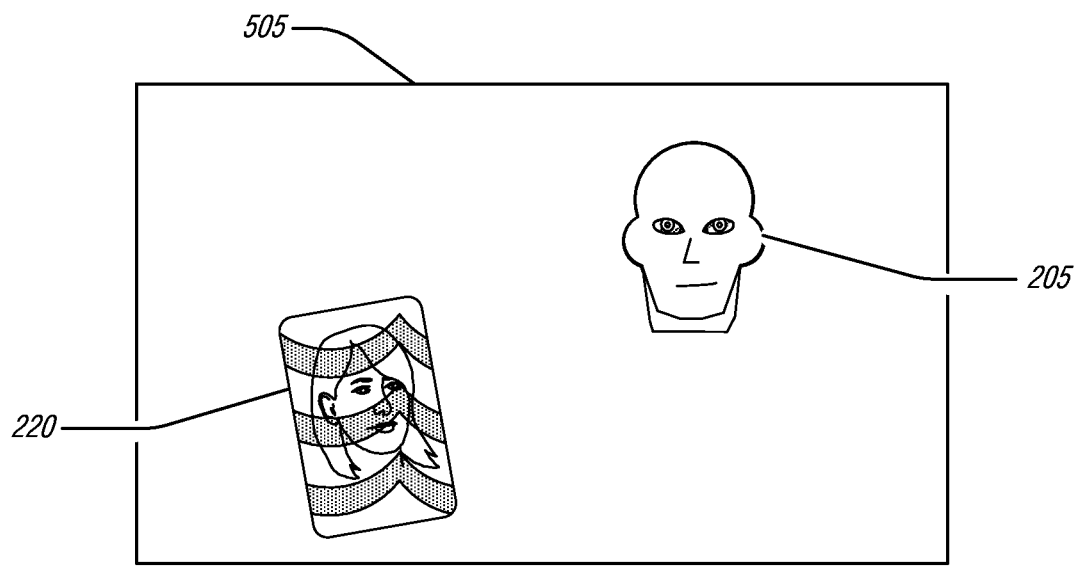

FIG. 5A is an example of an emitted pattern and FIG. 5B is an example of scene reflectivity 505 under the emitted pattern, according to an embodiment. In this example, the illustrated wave pattern is non-uniform and emitted by the display 145. Such an emission will project into the environment and reflect off of surfaces therein to be measured by the sensor 120, as illustrated in FIG. 5B. Conversely to the non-visible reflectivity described above, visible light reflectivity will be expected to be greater on the shiny surface of the device 220. Thus, the pattern is observable on the device 220 but not on the representation 205 of the user 115. In an example, where the pattern is sufficiently reflected from the user 115, the non-uniform nature of the user's 115 face will result in distortions to the pattern that may be observed. In either case, the device 220 has a differentiating reflection characteristic from that of the user 115.

The following describes additional features for this technique. This technique capitalizes on the reflective properties of many of the spoofing mediums by projecting a known pattern into the environment then detecting if a reflection is present on the spoofing image. Detection of this unique pattern in the sensor's 120 image suggests a spoofing device 220 is being used in place of the user's 115 face. Such an approach is better than, for instance, an anti-spoofing technique based on directed, or scripted, user movement because it avoids inconveniencing the user with socially observable directed movements (e.g. scripted blink or pose movements), making it transparent during the log-in identification stage. Doing so also maintains the initial ease-of-access promise of feature-based authentication.

In an example, a seemingly innocuous welcome screen is placed on the display 145. When the user 115 attempts to log in, no reflection is detected off their face due to the diffusion of the pattern on the face and clothes. However, when the device 220, such as a phone or tablet presents an individual's face 215 to the sensor 120, the pattern of the welcome screen as projected by the display 145 is reflected from the screen of device 220. In an example, the features of the pattern are tracked across multiple images in the sequence of images. If the signal to noise ratio is above a threshold, then this face 215 is declared invalid.

In an example, the pattern includes features that separate well from organic shapes found on the human face, upper torso, or other items of the body or worn on the body. In an example, pattern is supplied as part of the BFD 130. In an example, the pattern is part of the hardware, software, or firmware of the sensor 120. In an example, the pattern is supplied by the user 115. In an example, when pattern is submitted by the user 115, analysis and feature extraction may be performed on the image by system 105 to ensure the pattern may be detected when off of the device 220.

In an example, the pattern may move across the display 145. The dominant characteristic of a static image is the sharp edge contrast of straight lines. In an example, a moving set of high contrast line edges may sweep across the display 145 at a fixed rate of movement and thus be effective at detecting static images. This approach also has the benefit of increasing the signal to noise ratio. It also avoids the problem of features of the static pattern falling on parts of the face (e.g., a beard) that obscure the important aspects of the pattern. In an example, the system 105 may search for the features of the swept line or lines in the sensor's 120 field of view 110. If a pattern feature is detected in an image, the location of that feature in subsequent images is predicted using knowledge of the sweep rate and the sensor 120 sample time. In this way, additional certainty is achieved that the reflected pattern is being generated by the system 105.

Figure 6:
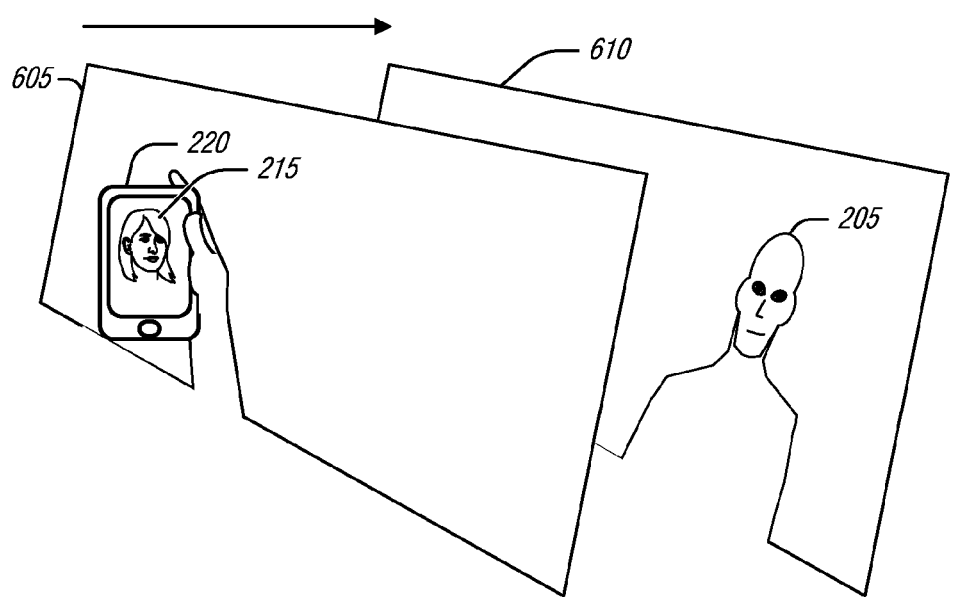
FIG. 6 is an example of distance planes in a scene, according to an embodiment.

FIG. 6 is an example of distance planes 605 and 610 in a scene 600, according to an embodiment. As noted above, the distance planes 605 and 610 may be determined via pattern scaling in the visible light spectrum, or pattern scaling, deformation, or time-of-flight in the non-visible light spectrum via emissions from the display 145, the emitter 150, or both. In a typical scenario, the device 220 would need to be held close to the sensor 120 in order to have the face 215 be large enough to attempt an authentication. When this proximity is compared to that of the representation 205 of the user 115, it becomes apparent that the face 215 is too small to be a valid human face.

Figure 7:
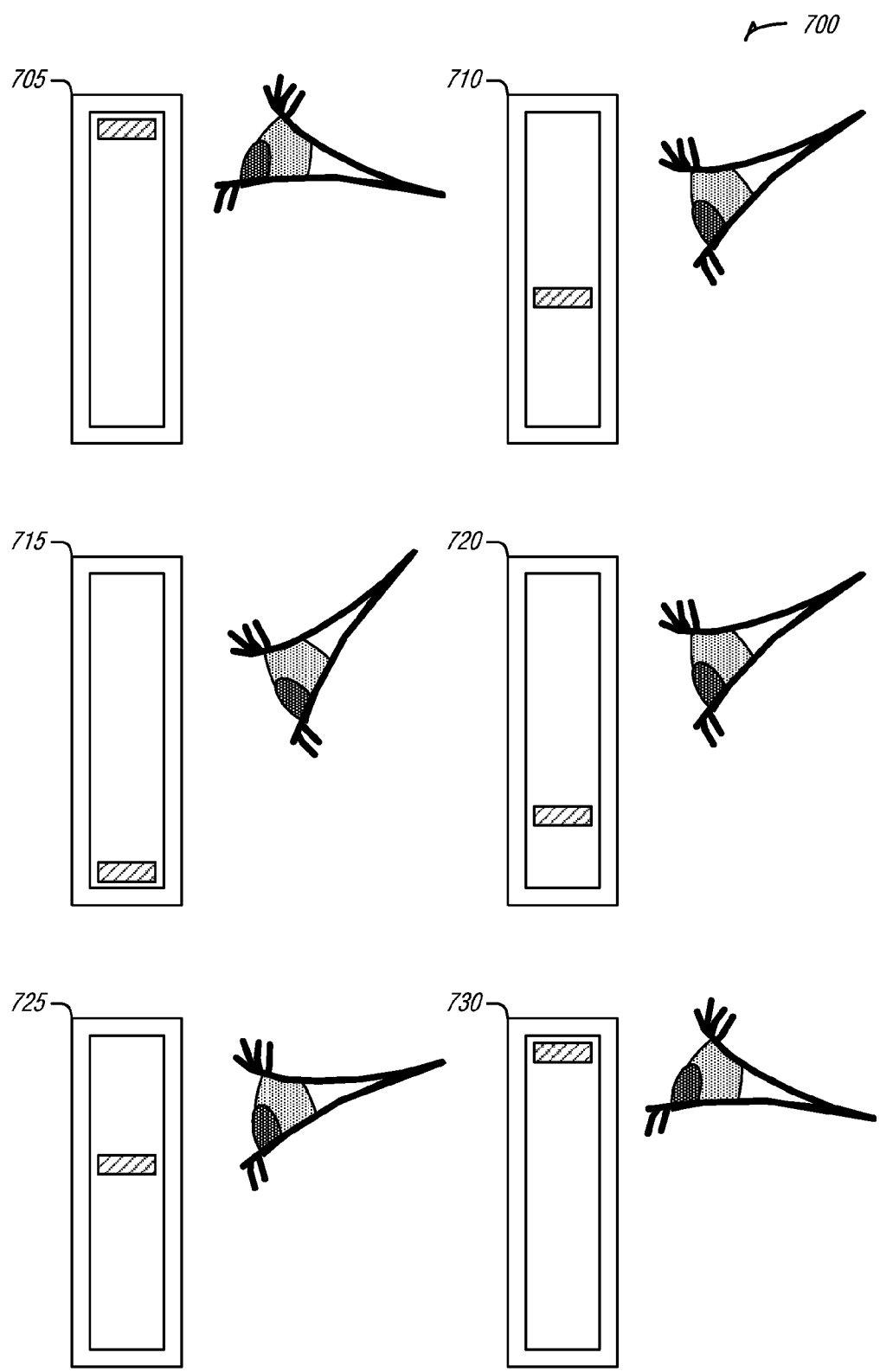
FIG. 7 is an example of eye gaze correlation to a proffered prompt, according to an embodiment.

FIG. 7 is an example of eye gaze correlation to a proffered prompt, according to an embodiment. FIG. 7 illustrates a sequence 700 of frames 705-730, each frame including a line position and corresponding eye position. As noted above with respect to FIGS. 1 and 5, a visible moving pattern may be emitted from the display 145. As the sequence 700 progresses, the pattern sweeps from the top to the bottom and back up again. The eye, a real eye, tracks the moving pattern as humans are instinctually inclined to do. In an example, the moving element may move in a non-linear fashion, such as stopping half-way down the display 145 and moving back up or jumping from the top of the display 145 to the bottom. In an example, the eye tracking may be performed by eyelid positioning (e.g., tracking eyelid position and inferring eye gaze direction).

In an example, the moving pattern may take many graphic forms including shapes (e.g., a horizontal line, star, etc.), pictures, or alphanumerical characters. Each time an authentication request is received, the moving pattern may start at a random spot on the display 145. In an example, the moving pattern does not span the entire display 145. For example, the moving pattern may be displayed within a window of a web browser. In an example, the moving pattern may be displayed on a separate device from where the authentication request originated. For example, a user 115 may carry a companion device that includes a camera and display screen for presentation of the moving pattern.

In an example, the sequence of images may be synchronized with the moving pattern. Synchronization may be time-based or pattern-location-based. For example, in a time-based approach, the sequence of images may be stored with a time-stamp of '0' at the moment the moving pattern is first displayed. Time-stamps may also be stored for each location of the moving pattern during the authentication sequence (e.g., the display of the moving pattern). When the video data is stored using a pattern-location-based approach the sequence of images includes an indication of where (e.g., the absolute coordinates or relative location to one or more edges of the display 145) the moving pattern was on the display 145 when the sequence of images were captured.

In an example, the sequence of images is analyzed to determine whether the position of a user's 115 eyelid is consistent with the position of the moving pattern. For example, an eyelid position of fully open may be considered to be consistent with the moving pattern near the top of the display 145. In an example, an eye tracking technique is used to locate a user's 115 eye(s) and determine the amount of the iris that is visible. The amount the iris visible may be used as a proxy for the position of the eyelid. Thus, if the iris is completely visible the position of the eyelid may be 100% open or fully open. In various examples, the amount of the iris may be measured from the top or bottom. In other words, the iris may be covered from the bottom or top.

Figure 8:
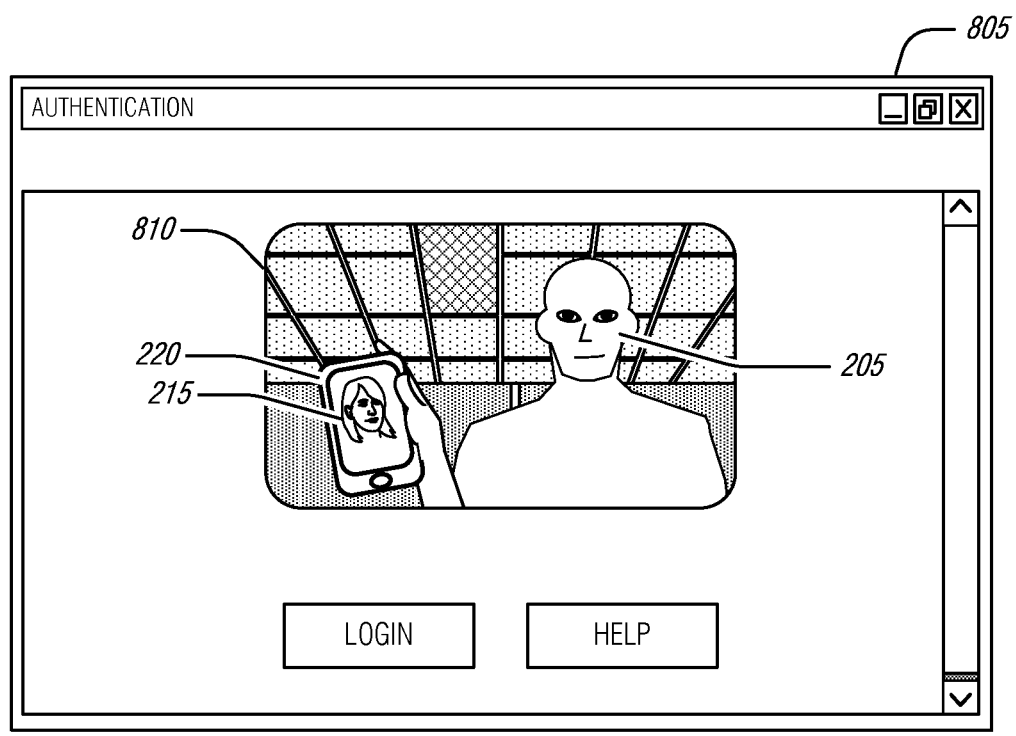
FIG. 8 is a block diagram of an example of user interface for image biometrics, according to an embodiment.
Figure 9:
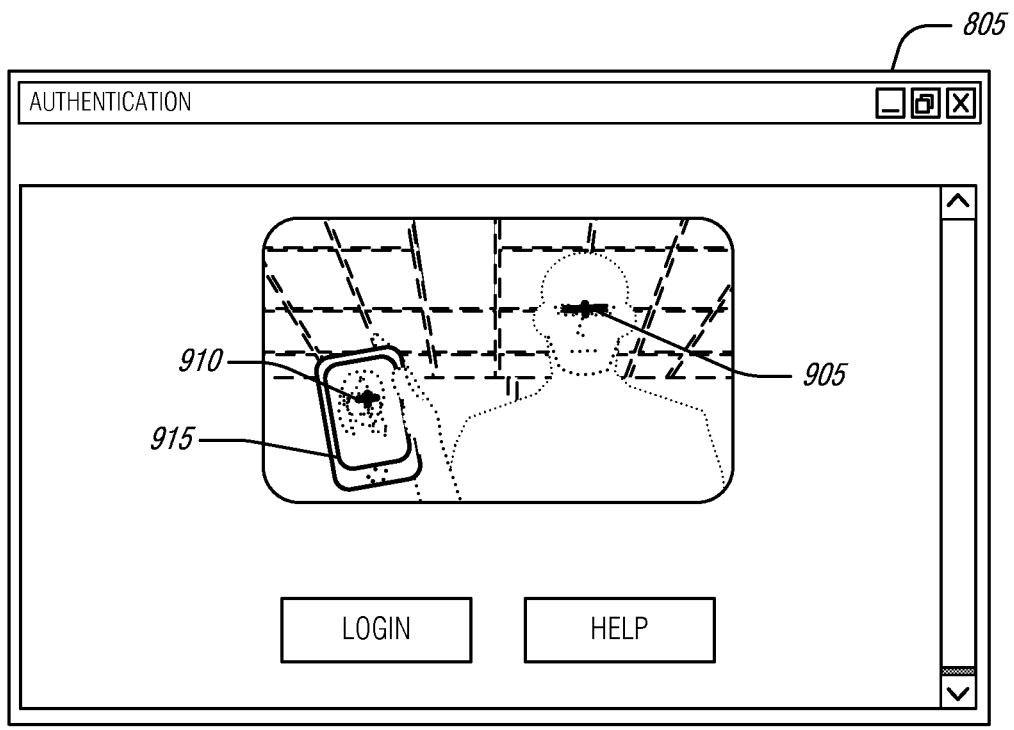
FIG. 9 is a scene line transformation with identified face markers, according to an embodiment.
Figure 10:
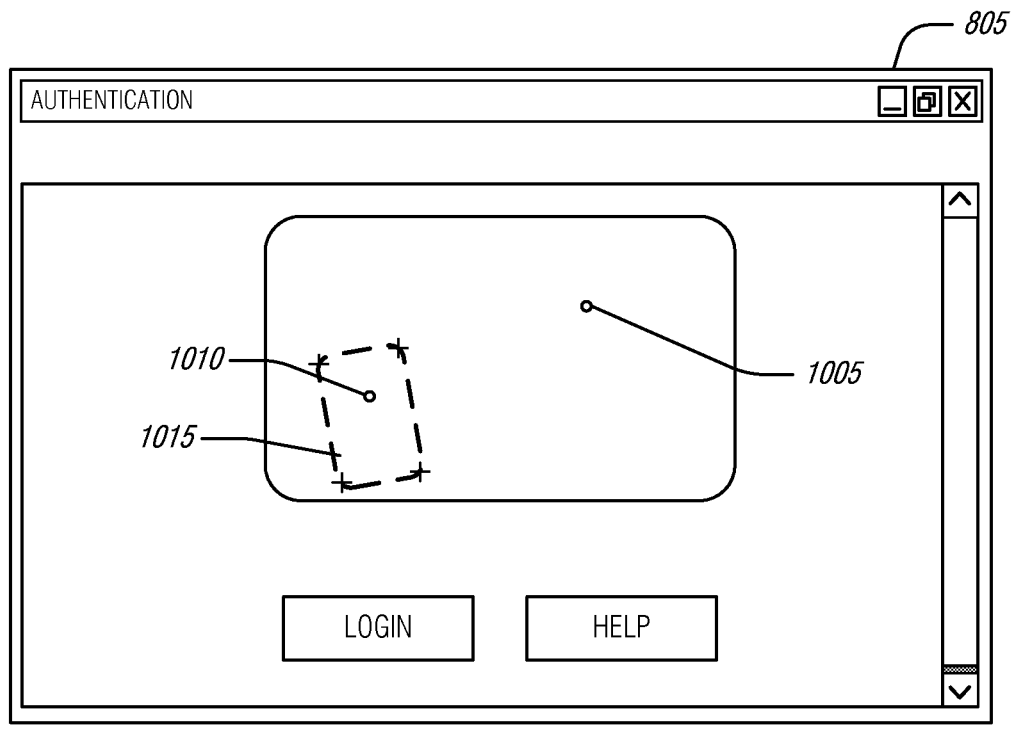
FIG. 10 is a scene simplification of a scene line transformation with identified face markers, according to an embodiment.

FIGS. 8-10 illustrate the use of a convex hull for liveness detection. This technique exploits the likelihood that a face framed in edges, especially moving edges, is unlikely to be a live face.

FIG. 8 is a block diagram of an example of user interface 805 for image biometrics, according to an embodiment. The interface 805 may include the sequence of images in a viewing port 810. As shown, the viewing port 810 includes a face 215 as well as the device 220 with a representation 205 of the user's 115 face.

FIG. 9 is a scene line transformation with identified face markers, according to an embodiment. The image illustrated in FIG. 8 may be analyzed to discern relative motion of environmental features and markers. As illustrated, dashed lines are non-moving edges, dotted lines are curved lines (e.g., not straight edges) in the image, and solid lines are moving edges. The BFD 130 may detect the represented faces and create the marker 905 for the live face and the maker 910 for the spoofed face. Further, the EFD 125 may determine that the edges 915 are moving together and enclose an area. The SD 135 and SIC 140 may determine that the marker 910 is within the moving edges 915, and thus such a face is a possible spoofing attempt that should be flagged or otherwise fail to authenticate the user 115. In contrast, the marker 905 is not within the edges 915 and so may not be so easily assessed as a spoofing attempt. However, if the marker 905 moves synchronously with the moving edges 915, it may be determined that everything in the image is a facsimile of the user's environment—although in the illustrated example, this is unlikely because some of the edges are not moving relative to the moving edges 915 as evidenced by the dashed lines.

FIG. 10 is a scene simplification of a scene line transformation with identified face markers, according to an embodiment. The moving edges of FIG. 9 may include more complexity than is necessary for performing the analysis (e.g., the display edges within the device edges as illustrated in FIG. 9). Further, it may be unnecessary to determine the orientation of a facial representation as long as the marker is determinable. The simplification of a scene line transformation provides for these simplifications by creating a convex hull 1015 based on a set of corners from the moving edges. As shown, the convex hull 1015 encompasses an area including the device's 220 edges. Further, markers 910 and 905 may be changed to secondary markers 1010 and 1005, in this example, a point at the mid-point of the eye line markers of FIG. 9. Thus, a straightforward determination as to whether a secondary marker is within a convex hull, as is the case with the secondary marker 1010 and the convex hull 1015, but is not the case with the secondary marker 1005 and the convex hull 1015, may be made. This allows for a concept of synchronization in which detecting a face within a moving device's confines is sufficient to identify a spoofing attempt. This approach has the further advantage that a video playing on the device 220, instead of a static image, used as the facsimile will not work because it still is framed by the device 220.

Figure 11:
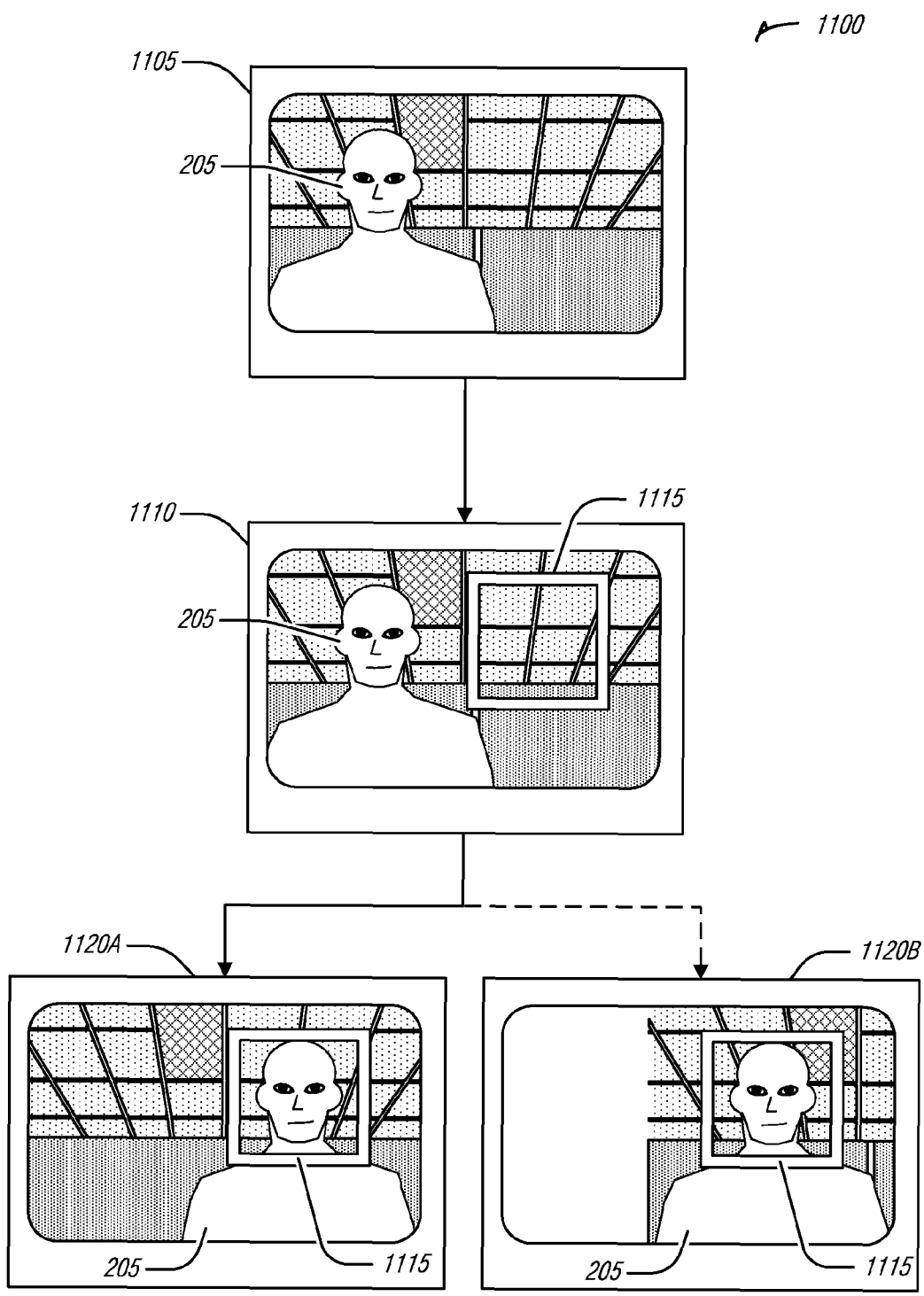
FIG. 11 is a sequence of an example user interface in which a target is presented to the user, according to an embodiment.
Figure 12A:
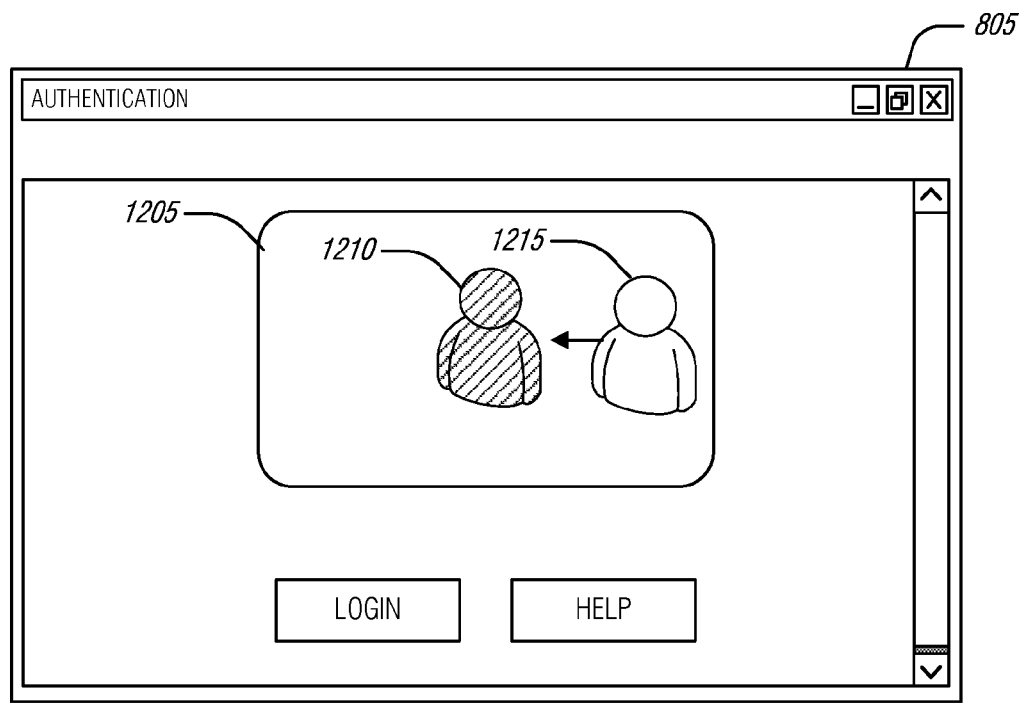
FIGS. 12A and 12B are example user interfaces of a target prompt presented to a user in which the scene is obfuscated, according to an embodiment.
Figure 12B:
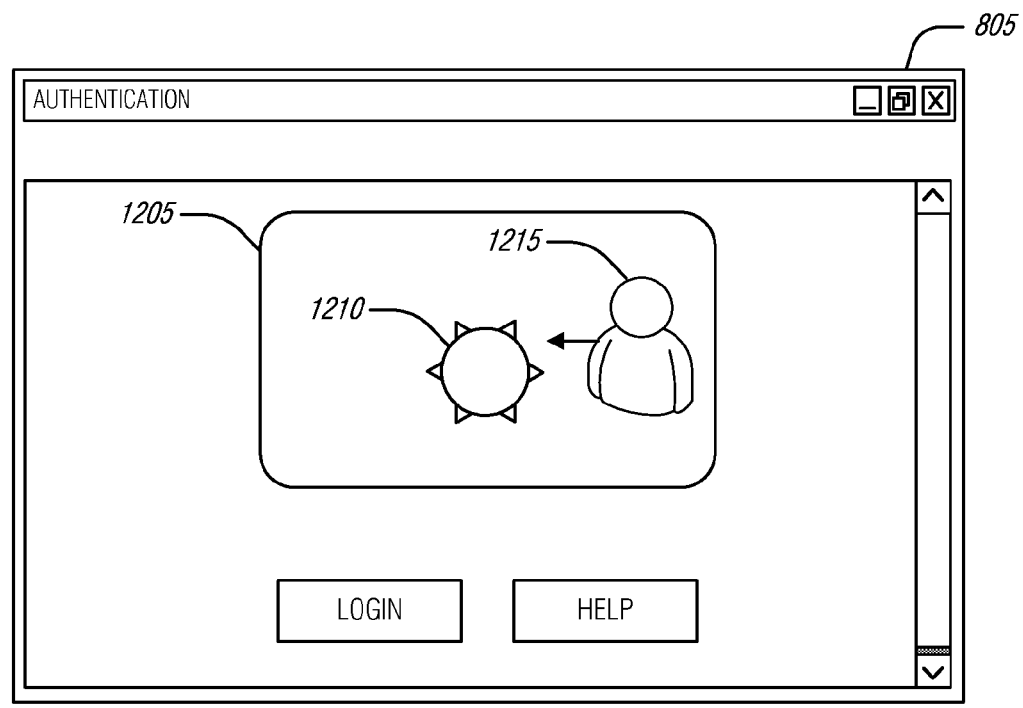
Figure 13:
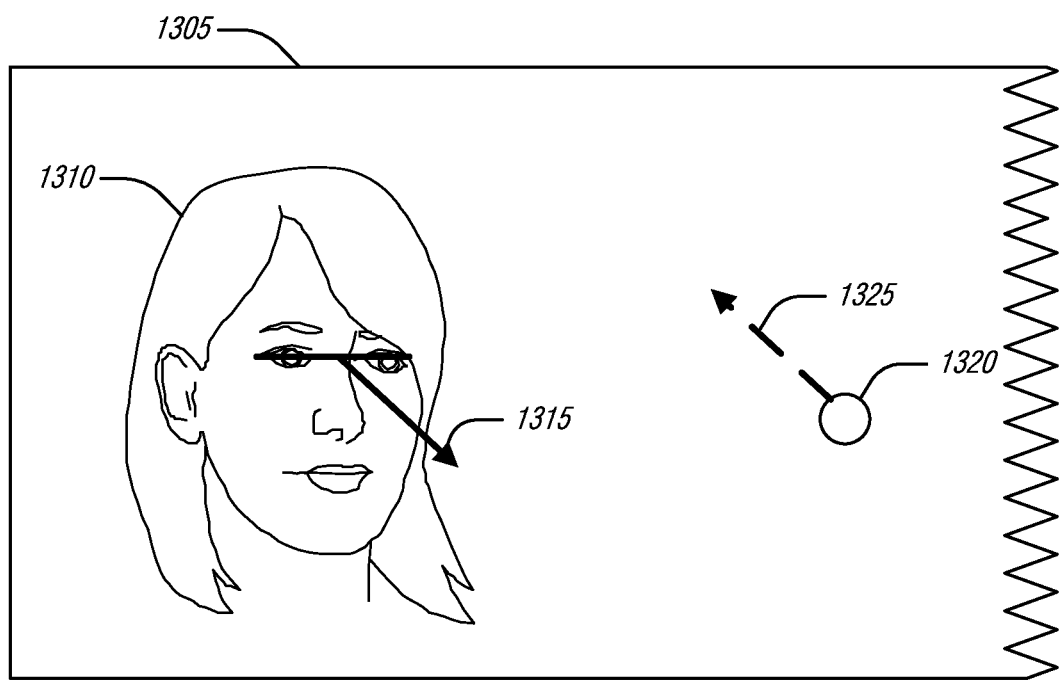
FIG. 13 is an example gaze vector determination to facilitate target placement, according to an embodiment.

FIGS. 11-13 illustrate various techniques in which the user's 115 movement against the background provides an indication as to whether or not the body part is live.

FIG. 11 is a sequence 1100 of an example user interface in which a target 1115 is presented in frame with the representation 205 of the user 115, according to an embodiment. A live user 115 moves against their background. In contrast, when an attacker tries to move a facsimile face 215 displayed by the device to simulate movement by the user 115, the background moves with the facsimile face 215. The system 105 may take advantage of this characteristic by making the user 115 perform an act that would be difficult to simulate with a static image. For instance, one could ask the user 115 to perform an action such as blinking or head turning.

The system 105, however, may take advantage of the difference between a live scene and a static image by enticing the user 115 to move after they are in front of the sensor 120. In an example, the system 105 places a target 1115 on the screen in a position that includes a portion of the representation 205 of the user 115, but is off-center from the representation 205. The target 1115 entices the user 115 to move so that her face 205 is centered on the target. This allows system 105 to check that the feature (e.g., the face, feet, hands, shape of eyes, etc.) being authenticated is moving independently from the background. The method is so fluid and natural the user 115 doesn't even feel like they had to do anything interactive.

As illustrated, when the user 115 approaches the sensor 120, the sequence of images are captured. The image includes a representation 205 of the user 115 and a background image. In a face-based authentication embodiment, authentication system 105 detects the position of the user's 115 face 205 in frame 1105 and projects a target 1115 around, but off-center from, the representation 205 in frame 1110.

The user 115 is enticed by the placement of the target 1115 to place their representation 205 within the target 1115 for authentication. In an example, the target 1115 is a much smaller view from the sensor 120 than what it may actually show, such as 200×200 pixels instead of 640×480. In an example, instead of always having this window at the center of the frame, it will move to a spot not currently occupied by the representation 205. The user 115 would then see that they are not in the frame defined by the target 1115, and would naturally move to the correct area. This movement presents the system 105 with enough data to ensure that the representation 205 moved but the background did not, as illustrated in frame 1120A. If the background moves as expected for a static image (that is, with the user 115), the image is a spoof, as illustrated in frame 1120B.

This flow is so natural that the user doesn't even think they are doing anything interactive. There are no words to read, no steps to follow, just a very natural positioning of their face.

FIGS. 12A and 12B are example user interfaces 805 of a target prompt 1210 presented to a user in which the scene is obfuscated, according to an embodiment. The user interface 805 includes a display area 1205, a visual target 1210, and a representation of a body part 1215. As illustrated, the representation of the body part 1215 is not modeled after the face, or other aspect of the user 115. Rather, the specific nature of the perceived body part is obfuscated to the user 115. By obfuscating the relationship between the actual image data in the sequence of images from the displayed representation, a malicious user will have greater difficulty determining how to move a facial facsimile in order to defeat the anti-spoofing technique described herein.

Although it was previously described that the target 1210 is presented at an offset from the representation 1215 of the user 115, neither the target 1210, nor the representation 1215 of the user 115 need hold any special relationship to a position (e.g., center) of the display area 1205. FIG. 12A illustrates a target 1210 that approximates the representation 1215 of the user 115, while FIG. 12B illustrates an arbitrary shape as a target 1210.

FIG. 13 is an example gaze vector 1315 determination to facilitate target placement 1320, according to an embodiment. As illustrated, the user's face 1310 is not on the target point 1320. The facial orientation is determined as a vector perpendicular to a plane containing a line between the user's eyes and centered on that line. The offset 1325 is a vector that is the inverse of a component (or all components) of the facial orientation vector 1315, centered on the target point 1320, and having a magnitude determined by the relative motion model to facilitate enough movement by the user 115—performed in attempting to move the representation 1215 of the user 115 onto the target 1210—to facilitate the scene analysis anti-spoofing technique.

FIGS. 14-17 illustrate observing eye blinking and comparing that observed blinking against a model to determine whether the corresponding face is live. Existing solutions for liveness detection may use blink and head movement tracking as means to differentiate a real subject from a spoofed one. Blink detection solutions deployed in current face recognition products often use binary eye states—opened eye and closed eye—and detect a blink by computing the difference between those two states. These solutions have several drawbacks. First, these solutions usually require a user 115 to be still during face capture to try to prevent false blink detections; false blink detections tend to increase if the user 115 is walking or otherwise moving (such as in or on a vehicle). Second, these solutions usually require very good lighting conditions. Third, these solutions usually need very good cameras with excellent signal-to-noise ratios ("SNRs"). Fourth, these solutions usually require the user's 115 eyes to open wide; they usually do not work as well with smaller eyes or with faces at a distance. Finally, these solutions tend to be spoofed easily with image-manipulated animations.

In contrast, the example given herein performs successfully with any digital camera, including the low-quality embedded cameras included in most low-cost laptops currently on the market. In some examples, SNR is not important because a sequence of eye movements is tracked instead of single images, reducing the quality needed for any given image. Further, noise present in the sequence, even if the noise is significant, is likely present in each frame of the sequence, and the algorithms factor out this noise.

Figure 14:
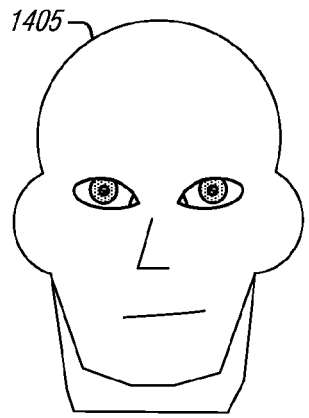
FIG. 14 is an example of a sequence of eyelid movements in a blink, according to an embodiment.
Figure 14:
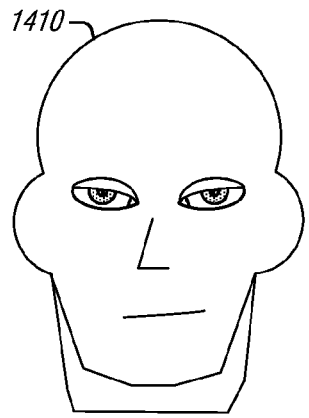
Figure 14:
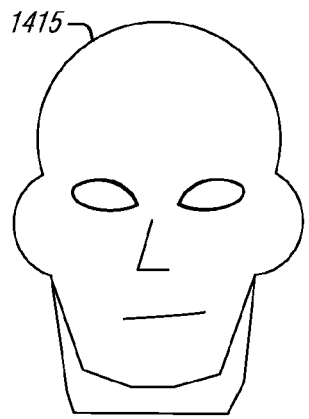
Figure 14:
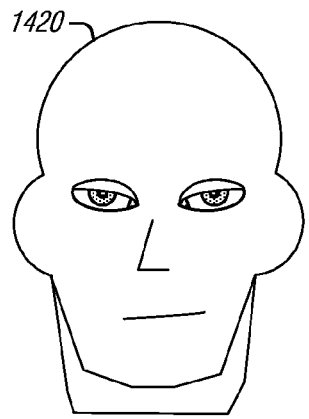
Figure 14:
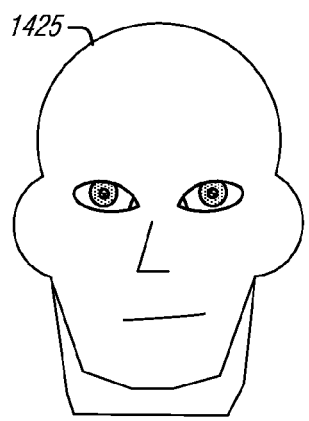

FIG. 14 is an example of a sequence 1400 of eyelid movements in a blink, according to an embodiment. As the sequence 1400 progresses from frame 1405 to 1410 to 1415, the eyes are blinking shut. Frames 1415 to 1420 and 1425 illustrate the opening portion of the blinking sequence 1400.

Figure 15:
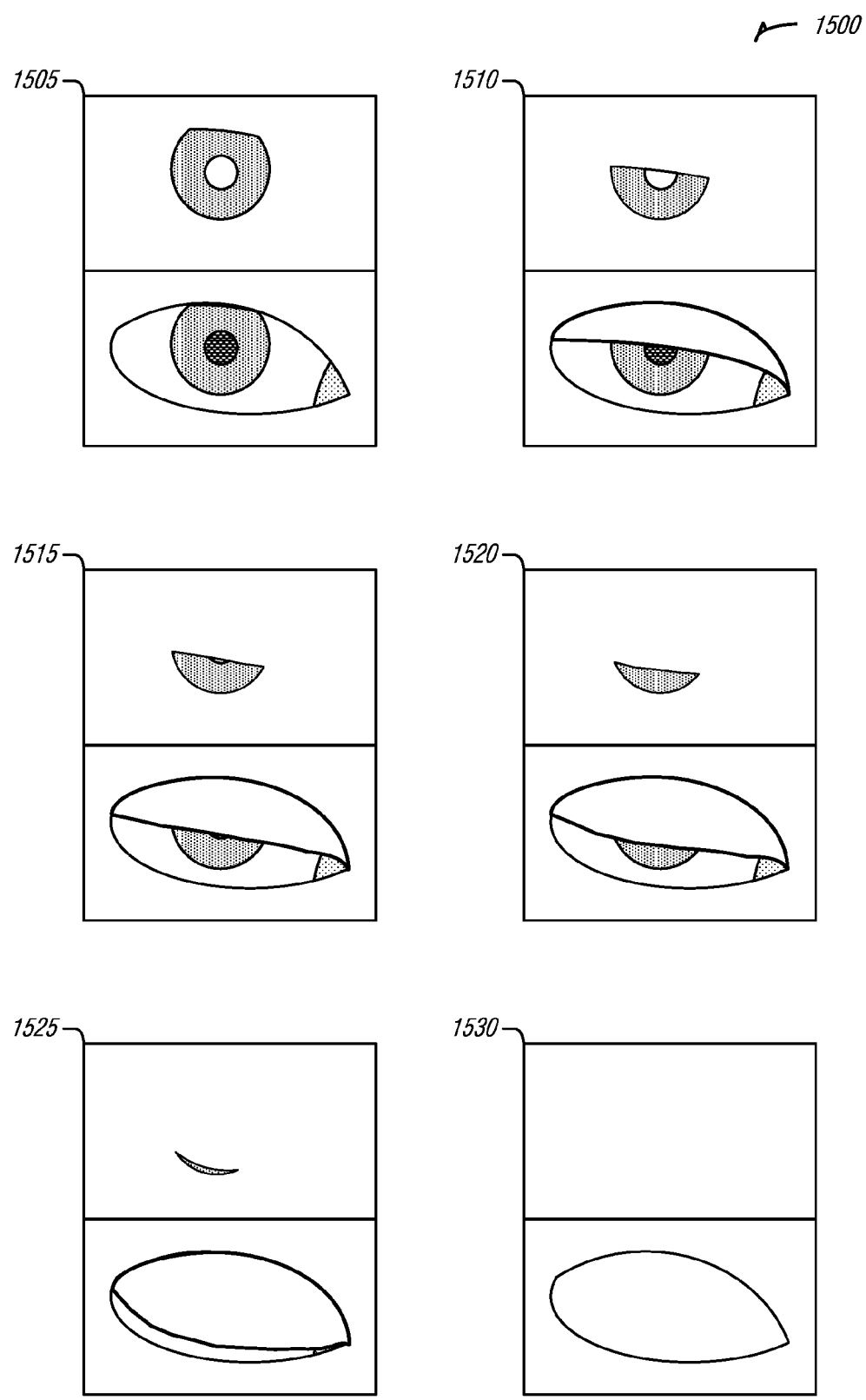
FIG. 15 is a sequence of frames tracking blink characteristics of an eye, according to an embodiment.

FIG. 15 is a sequence 1500 of frames tracking blink characteristics of an eye, according to an embodiment. Specifically, the sequence 1500 illustrates a typical human blink pattern as an eye transitions from an opened position to a closed position. Original images of the eyes (bottom), as well as binary (e.g., black and white) image versions of the eyes (top) are shown for each frame 1505-1530 to illustrate how some embodiments track the eyelid's position in a sequence of frames. A sequence of eyelid positions, such as those illustrated, may be used to detect whether the eyelid in the sequence of frames 1500 transitions between opened-eye (e.g., frame 1505) and closed-eye (e.g., frame 1530) positions in a natural (e.g., normal) or unnatural (e.g., abnormal) manner. In an example, pixel intensity changes are monitored from closed eye (e.g., frame 1530), to partially opened eye (e.g., any of frames 1510-1525), and then to fully opened eye (e.g., frame 1505). In an example, the pixel intensity changes are monitored in reverse order. In an example, the pixel intensity changes of both orders (e.g., closed eye to opened eye and opened eye to closed eye) are monitored. In an example, many (e.g., more than 3) different states of eyelid movement are monitored.

Figure 16:
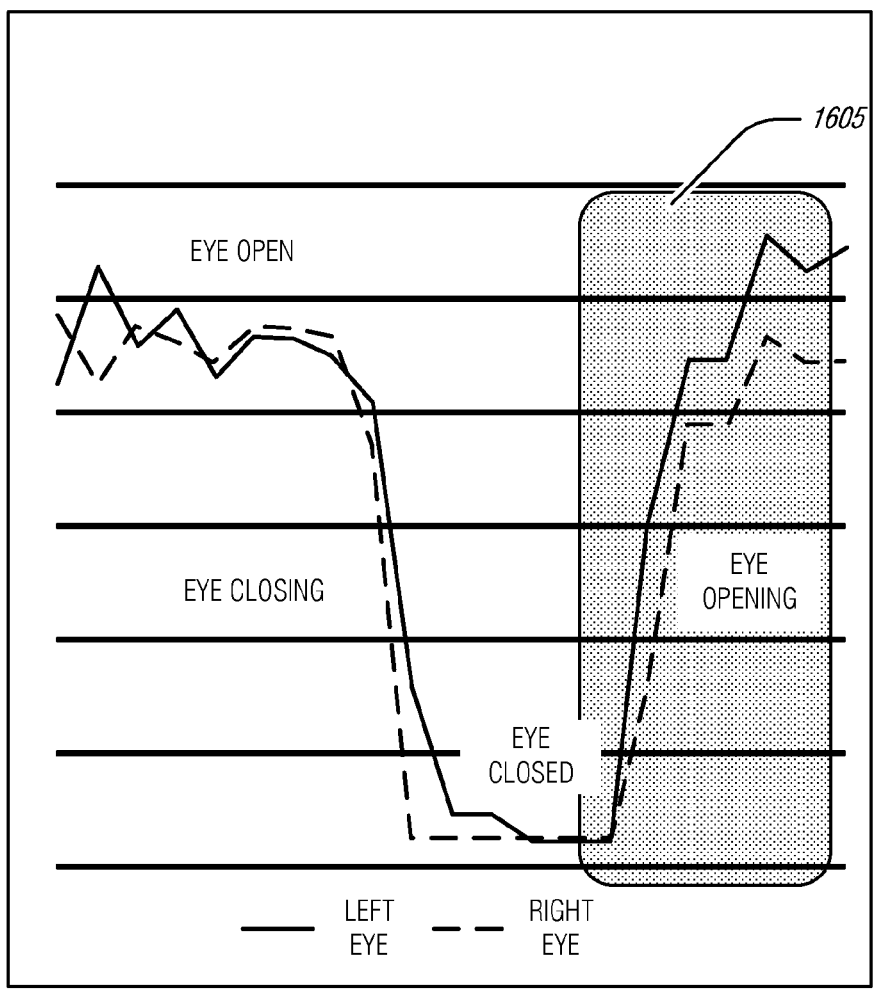
FIG. 16 is an example activity analysis of a blink for each of two eyes, according to an embodiment.

FIG. 16 is an example activity analysis 1600 of a blink for each of two eyes, according to an embodiment. The activity analysis 1600 illustrates an eyelid sequence in a typical human blink pattern. In the illustrated chart, the x-axis is time and the y-axis is a measure of how open the eyelid is. As illustrated in FIG. 16, a normal blink pattern of a human follows a sinusoidal-like wave between the states of opened eye and closed eye. Furthermore, a normal blink pattern has a steady opened eye position prior to a blink, then substantially uniform closing and opening eyelid sequences during the blink. Although the left eye and the right eye move in near synchronicity and produce similar movements, in a normal blink pattern of a human, the left and right eyes usually display slight variations between each other. Blinks simulated using manipulated images and image-manipulated animations usually do not show such sequences. In an example, a pattern recognizer 1605 operates on an eye opening movement, an eye closing movement, or both. In an embodiment illustrated in the activity analysis 1600, the pattern recognizer 1605 operates on the eye opening movement.

Figure 17:
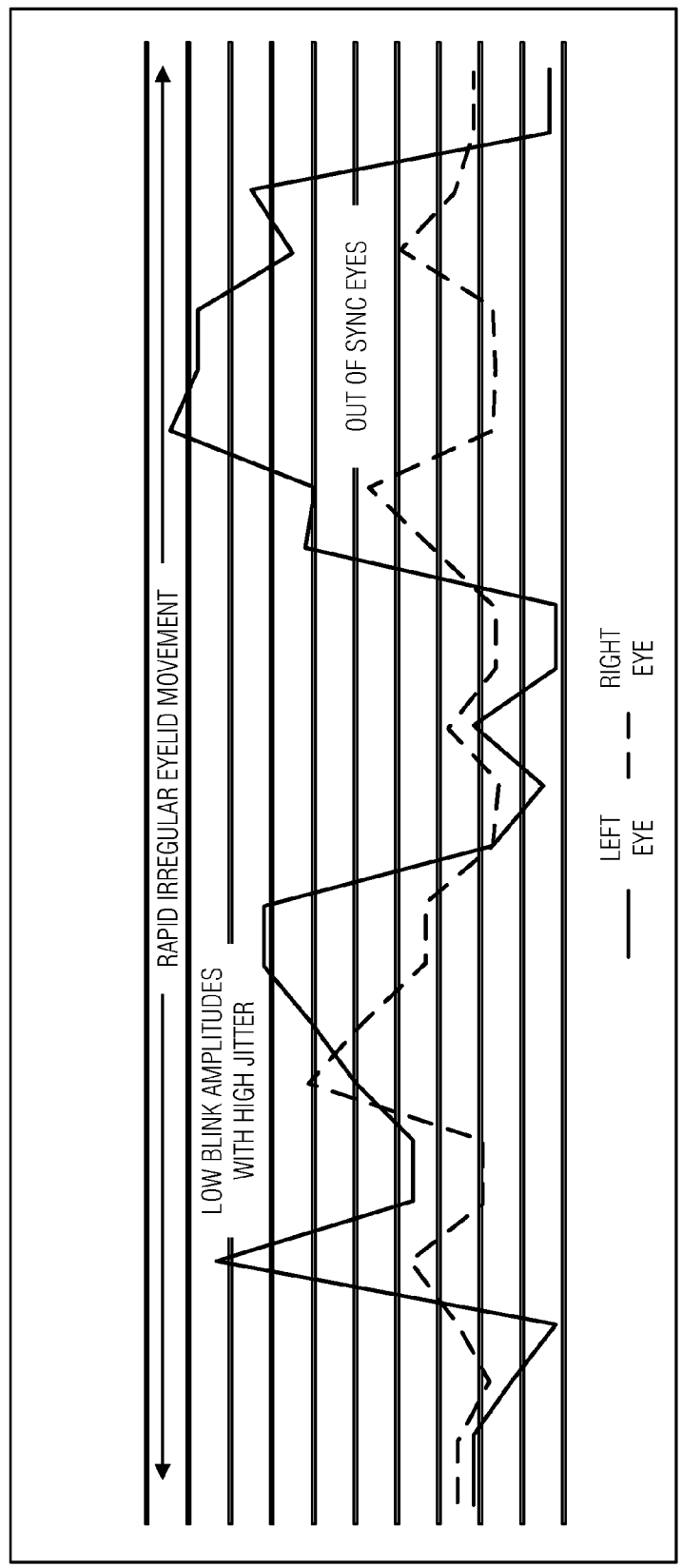
FIG. 17 is an example activity analysis of a blink for each of two eyes, according to an embodiment.

FIG. 17 is an example activity analysis 1700 of a blink for each of two eyes, according to an embodiment. The activity analysis 1700 illustrates an example abnormal blink pattern observed during a liveness spoofing attack based on an image-manipulated animation. In an example, eyelid movements that have low amplitudes and or high jitter are detected and flagged as abnormal. In an example, unsynchronized eyelid movements are detected and flagged as abnormal. In an example, unsynchronized eyelid movements include eyelids that move in opposite directions.

Figure 18:
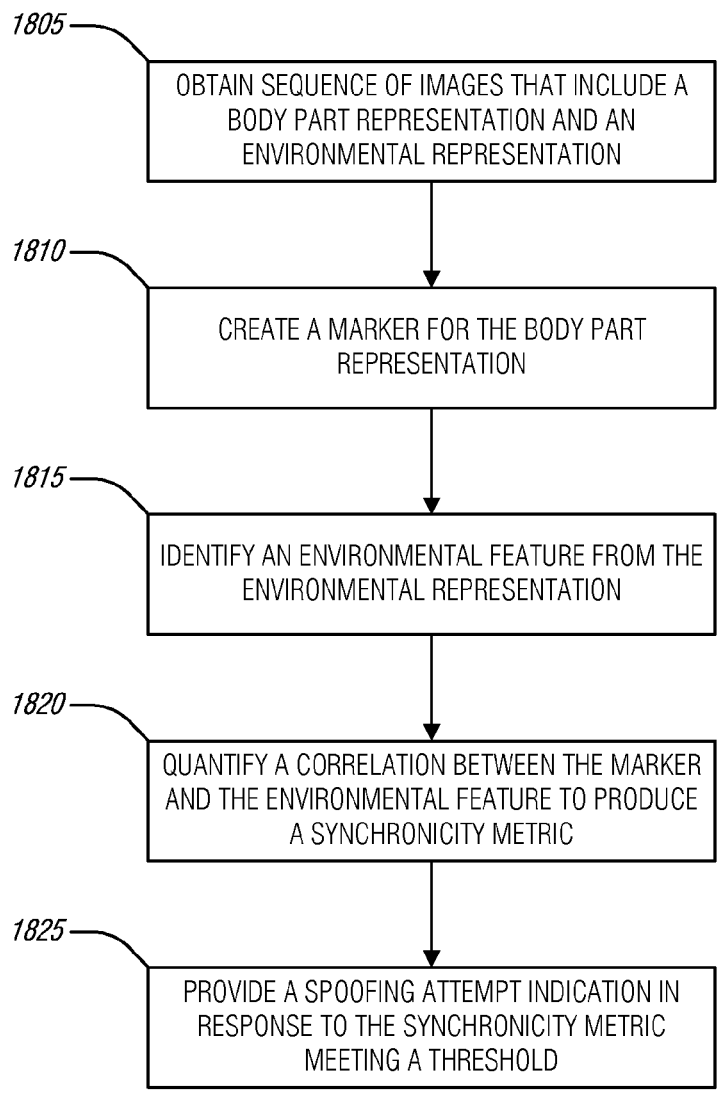
FIG. 18 illustrates a flow diagram of an example of a method for spoofing detection in image biometrics, according to an embodiment.

FIG. 18 illustrates a flow diagram of an example of a method 1800 for spoofing detection in image biometrics, according to an embodiment. The operations of the method 1800 are performed on computer hardware, such as the components described above with respect to FIG. 1 or below with respect to FIG. 20. As noted above, detecting a spoofing attempt is one side of a coin in image based biometric authentication; the other side being liveness detection. The method 1800 is directed to ascertaining whether a face is artificial, or spoofed. However, many of the described techniques may be changed slightly to perform a liveness evaluation.

At operation 1805, a sequence of images may be obtained from a camera. A first plurality of images in the sequence of images may include a representation of a user body part and a representation of an environment of the user. In an example, the body part is a face. In an example, the sequence of images may be processed to reduce noise. In an example, the sequence of images may be processed to reduce color information. In an example, the color information may be reduced to 1 bit per pixel (e.g., black and white). In an example, capturing the sequence of images may be initiated as the used approaches the camera.

At operation 1810, a marker may be created for the representation of the body part. The marker corresponds to a feature in the representation of the body part. In an example, the marker may be a scaling applied to the body part. In an example, the measurement of the body part based on the depth measurement and the representation of the body part may be determined by extrapolating the size of the body part using the depth image and dimension of representation of the body part. Such scaling may be accomplished by taking the pixel representation of the body part in the sequence of images and transforming it by a perspective model given a distance of the object in the scene from the camera. In an example, the measurement of the body part may include a depth map of the body part.

In an example, the marker may be a line drawn between eyes in a face. In an example, the marker may be a single point at the center-point between the eyes. In an example, the marker may be a measured eye blinking sequence. In an example, the measured eye blinking sequence may be determined by extracting, from each image in the sequence of images in which an eye of the user is detected, a respective region of interest corresponding to each eye of the user, the respective region of interest including an eyelid. Then, for each respective region of interest, a respective score corresponding to a percentage of the eye unobstructed by the eyelid may be calculated to create a series of respective scores.

At operation 1815, a feature of the environment of the user present during a second plurality of images in the sequence of images may be identified. In an example, identifying the feature of the environment may include emitting a pattern into the environment. The pattern is composed of a frequency and an amplitude of light at positions within a field of view of the authenticating camera. Thus, the pattern may be uniform, such as a uniform amplitude of a single wavelength across the field of view (e.g., a solid pattern) over time, or non-uniform, such that at least one of wavelength or amplitude are varied across the field of view over time, such as a green star with a white background being projected into the field of view. In an example, the non-uniform pattern may be a moving pattern discernable to either the user or to the camera. A moving pattern includes at least one variance in wavelength or amplitude that changes in relation to other emitted features to suggest movement over time (e.g., the replication of a horizontal black bar on subsequently greater rows of the raster representation of an image over time while previous representations of the bar are either not reproduced or covered (e.g., by a background image or color) giving the impression that the bar is moving downward).

In an example with a moving, non-uniform pattern, operations of the method 1800 may optionally include: tracking a gaze of an eye from the representation of the body; measuring the degree to which the gaze tracks the moving pattern; and providing a second spoofing attempt indication in response to the degree to which the gaze tracks the moving pattern meets a predetermined range. In this example, the user's natural inclination to track moving objects may be exploited to determine user liveness without an additional procedure or instruction. Thus, such an observation may be combined with the other spoofing indications to render a more accurate spoofing decision without additional overhead activity by the user. In an example, the gaze of the eye may be determined by measuring the amount of iris visible for the eye. To ensure accurate results, a calibration session may be conducted at some point for the user and stored to assess the eyelid positions for the user to ascertain the gaze of the eye. Such a calibration session may include presenting a moving prompt, capturing a second sequence of images during presentation of the moving prompt, measuring a correspondence of user eyelid positions to the moving prompt from the second sequence of images, and using the correspondence as the threshold for the user.

In an example, the pattern may be emitted in a light spectrum that is not visible to the human eye. Such non-visible light may be infrared (IR) or longer wavelength light, or ultraviolet or short wavelength light.

In an example, the environmental feature may be a depth measurement of the body part derived from the pattern. For example, an IR depth camera may be used to ascertain depth information for objects in the scene. In an example a visible light depth calculation, such as noting the scaling of a non-uniform pattern reflected to the camera, may be used to gather depth information.

In an example, the feature of the environment may include a reflectivity of the pattern in an area of the environment that contains the marker for the body part. Such reflectivity may indicate a material or surface at that area which may be inconsistent with a non-spoofed body part. For example, the human face is partially reflective in the near-infrared while most commercial inks and device screens are not. However, glossy surfaces, such as photo paper or devices screens often reflect visible spectrum light better than a human face.

In an example, the feature of the environment may include a convex hull of points on edges detected in the plurality of the images. Such a structure provides an area enclosed by edges that move together throughout the sequence of images, such as the border of a device or device screen. In an example the edges may be compared to a catalog of device edge configurations to determine whether the edges represent a known device. The specific convex hull of points may then be fit to a physical configuration of the known device. In an example, only moving edges are used for the edges. That is, non-moving edges between images in the sequence of images are ignored.

In an example, the environmental feature is a background proximate to the body part.

In an example, the environmental feature may be a model of an eye blinking sequence. Such a model exists prior to the capture of the sequence of images.

At operation 1820, a correlation between the marker and the feature of the environment in the sequence of images may be quantified to produce a synchronicity metric of the degree to which the marker and the feature of the environment correlate. In an example, where the marker is a scaling of the body part and the environmental feature is a distance from the camera to the body part, the correlation may be the degree to which the measurement of the body part conforms to a live body part at the depth measurement. Thus, it may be ascertained whether the body part is too small to be from a valid human, such as would be the result if a representation in a phone display, or a small replica of the person were used in a spoofed authentication attempt.

In an example, the correlation between the marker and the feature of the environment and the marker may be the degree to which the area reflects the pattern. As noted above, such a correlation may provide insight into a material provide the body part representation in the sequence of images. In an example, the homogeneity of the pattern may be used to correlative effect. For example, the homogenous absence of IR light reflected from device screens and the heterogeneous IR reflection from human faces may be the basis for correlating the body marker to the environmental feature.

In examples where the environmental feature is a convex hull of points, the correlation between the marker and the convex hull is the degree to which the marker is located within the convex hull.

In an examples where the feature of the environment is a background proximate to the body-part, the correlation may be the degree to which the proximate background moves with the marker. Thus, if a marker, moves across the sequence of images from right to left, and a background, such as an edge, mirrors the marker's movement, change in orientation, etc., there would be a highly correlative movement between the two components. Thus, the synchronicity metric is the degree to which these movements actually correlate. To facilitate measuring the correlative movements of these components, it may help to induce the user to move. To this end, a target may be displayed to the user along with a representation of the body part. The user is not provided specific instruction, but may rather instinctively attempt to move the body part to the target. Thus, this mechanism induces some user movement, but the movement is a degree of movement and the specific type of movement (e.g., assuming a set of scripted positions) is not relied upon.

In an example, the target may be an outline of a shape sized such that the representation of the body part fits inside the shape when a center of the shape coincides with a center of the representation of the body part. In an example, the shape may be a rectangle. In an example, the target may be a shape sized such that the representation of the body part does not fit inside the shape when a center of the shape coincides with a center of the representation of the body part. In an example, the representation of the body part may be symbol obfuscating at least one feature of the body part from the sequence of images. In an example, the symbol is an illustration of the body part.

In an example, the target may be displayed at an offset from the body part. In an example, the offset may be determined by a relative motion model defining a motion parameter of the body part to distinguish between foreground objects and background objects in a field of view of a camera capturing the sequence of images. In an example, where the body part is a face, the direction of the offset is the inverse of an orientation of the face. In an example, the distance of the offset from the representation of the body part may not be coupled to a pixel position difference between the body part captured in the sequence of images and the target. That is, the offset need not reflect the reality of the difference between the body part in the sequence of images and the area filled by the target. In an example, the relative motion model includes a threshold of movement sufficient to distinguish foreground objects from background objects. In an example, displaying the representation of the body part may include modifying the motion of the body part using the relative motion model. Such modifications may include speeding up or slowing down the movement at various points throughout the moving. Thus, the user may traverse the entire image from left to right which the display still indicates the body part being left of the target.

In an example, the correlation is the degree to which the measured eye blinking sequence marker described above conforms to the eye blinking environmental model. Such a correlation addresses inaccurate attempts to animate a still picture used for spoofing to simulate blinking. In an example where the eye blinking sequence is determined by calculating, for each respective region of interest, a respective score corresponding to a percentage of the eye unobstructed by the eyelid to create a series of respective scores, the degree to which the measured eye blinking sequence conforms to the model may be determined by processing, through a pattern recognizer, the series of respective scores. The pattern recognizer may check the series of respective scores for at least one of an abnormal eyelid sequence or an abnormal blink sequence based on the eye blinking model. In an example, the pattern recognizer may serially check the abnormal blink sequence after verifying that the eyelid sequence is normal. In an example, the model defines an eyelid sequence corresponding to eyelids that move in opposite directions as an abnormal eyelid sequence.

At operation 1825, a spoofing attempt indication may be provided in response to the synchronicity metric being beyond a threshold. In an example, an authentication process may deny authenticating the user in response to the spoofing attempt indication. In an example, wherein the correlation is based on emitted light reflectivity, the threshold may define a minimum reflectivity of the pattern. Thus, a spoofing attempt is indicated where the reflected pattern is above the threshold. Such is the case in a visible light pattern reflected from a device screen. Such reflection is unlikely to occur from a human face. In an example, the minimum reflectivity of the pattern may include a minimum reflectivity of a specified feature of the pattern. For example, if a high contrast image of a star were emitted, a faithful reproduction may be expected to be reflected off of a flat surface, such as a screen, and not a human face, even if a reflection from the face is discerned. In an example, the pattern is moving and the degree to which the area reflects the patter may include determining whether the specified feature of the pattern moved an expected distance.

In an example, the threshold may define a maximum reflectivity of the pattern. In such a case, the expectation is that the emitted light will reflect better off of the true body part than it will off of the facsimile, as happens with IR light. Thus, a spoofing attempt face occurs in an area with little to no IR reflection.

In examples where the user is encouraged to move via a target, and the correlation producing the synchronicity metric is the movement of the marker and a proximate background, the spoofing indication may be provided prior to the marker reaching the target. Thus, as explained above, the user need not actually reach the target, but simply move enough to determine relative movement of foreground and background objects. When the foreground and background objects move together, a spoofing attempt has likely been attempted.

Figure 19:
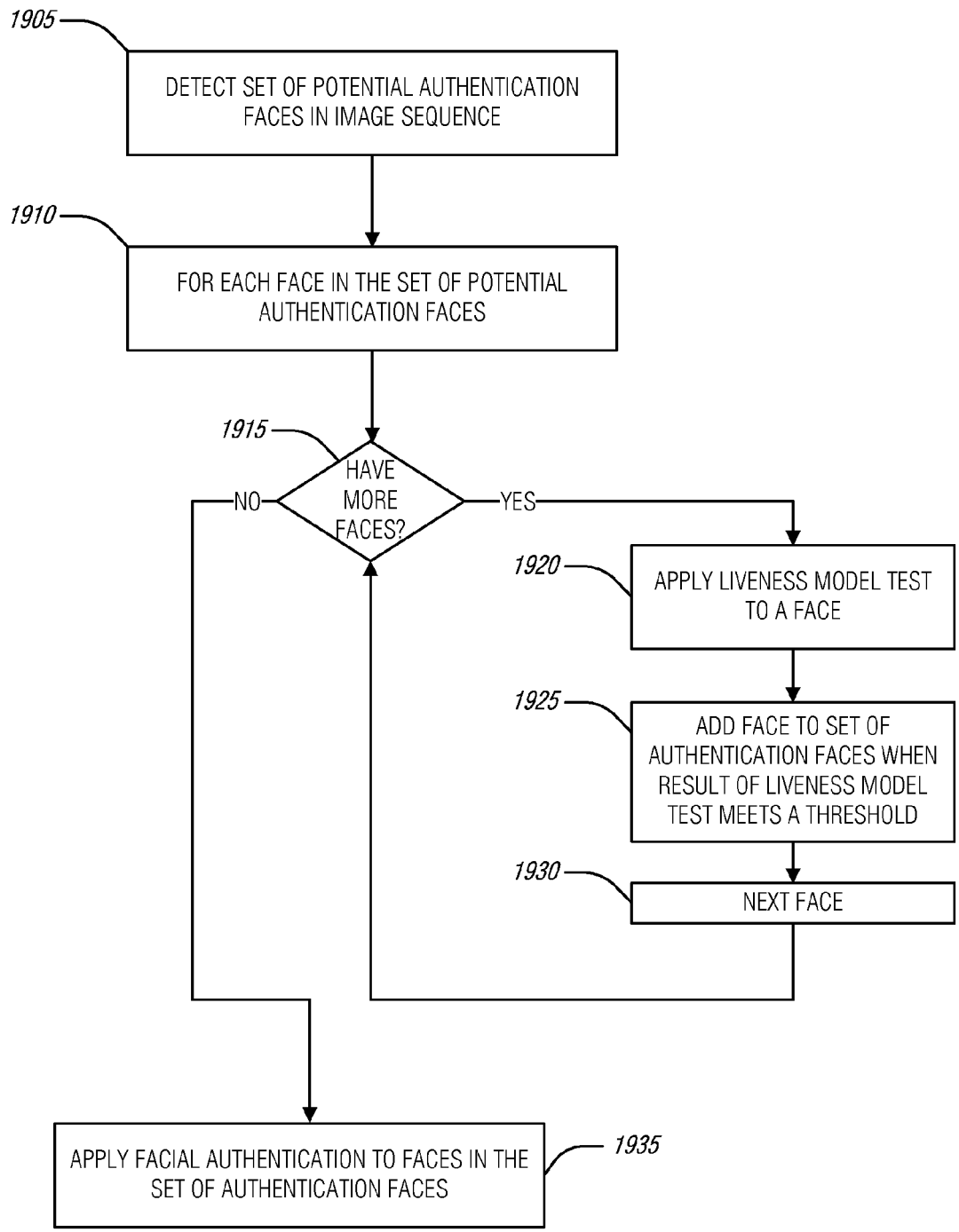
FIG. 19 illustrates a flow diagram of an example of a method for facial liveness detection in image biometrics, according to an embodiment.

FIG. 19 illustrates a flow diagram of an example of a method 1900 for facial liveness detection in image biometrics, according to an embodiment. The operations of the method 1900 are performed on computer hardware, such as the components described above with respect to FIG. 1 or below with respect to FIG. 20. As noted above, detecting a liveness detection is one side of a coin in image based biometric authentication; the other side being spoofing attempt detection. The method 1900 is directed to ascertaining whether a face or other body part is live, as opposed to a facsimile. However, many of the described techniques may be changed slightly to perform a spoofing attempt evaluation.

At operation 1905, a set of potential authentication faces may be detected in an images sequence captured during an authentication attempt by a user.

At operation 1910, an iterative process is applied to the detected faces to determine which are live and which are not.

At decision 1915, if there are no more new faces (e.g., each face in the set is processed once), the method 1900 proceeds to operation 1935.

At operation 1920, a set of liveness model tests is applied to the current face. As noted above, more than one test may be used to provide insight into the liveness of the face. Each test in the set of liveness tests may include an assay (e.g., test) that differs between a live face and a face simulated on a pictorial representation of a face. That is, the assay distinguishes between a true face and a facsimile based on at least one model of a live face. For example, human faces may have an acceptable size range determined empirically. A facsimile present on a pocket-sized screen is probably much smaller than the acceptable size range. Thus, the assay tests the size of the face to determine whether it is within the acceptable size ranger. Further, the assay operates independently of body arrangement instructions given to the user. That is, the assay does not use, nor rely, on giving the user instructions, such as blinking on command, positioning the arms in a particular manner, etc. Although the assay may use prompts, the user is given no specific instruction as to what to do with the prompt. Thus, the user is unburdened by any particular script when authenticating.

In an example, a test in the liveness model may include emitting light towards the face with an emitter. The test may also include measuring an interaction of the light with the face. The test may further include comparing the interaction with a model of a live face. Tests that use emitted light may provide a number of useful measurements to be used by the test's assay. In an example, the interaction of the light with the face provides a distance measurement between the face and the emitter. In this example, the model of the live face may include an acceptable size range of a live face. Thus, comparing the interaction with the model may include scaling a visual light spectrum representation of the face acquired from the images sequence (e.g., the captured picture of the face) using the distance measurement to determine whether the face is within the acceptable size range of a live face.

Another useful measurement from emitted light is the reflectivity of the various scene surfaces with various types of light. In an example, the interaction of the light with the face may be a reflectivity measurement of the character of the light reflected from the face. Light characteristics may include amplitude or wavelength over an area as well as time. In an example, emitting the light may include emitting non-visual spectrum light. In this example, the model of a live face may include a non-uniform positive reflectivity of the light. That is, the live face reflects a detectable amount of the non-visible light. Moreover, the reflected light is non-uniform (uniform reflection suggesting a flat surface inconsistent with a human face). Thus, comparing the interaction with the model of the face may include determining whether the area in which the face was found has non-uniform positive reflectivity in the non-visual spectrum light. In an example, the non-visual spectrum light is IR light.

In an example, emitting the light may include emitting a non-uniform pattern of visible light. As noted above, a non-uniform pattern varies in at least one of wavelength or amplitude over an area (such as that shown in FIG. 5A). In this example, the model of a live face does not reflect, or poorly reflects, the pattern. A poor pattern reflection may be addressed by adjusting the threshold (e.g., a filter) over which reflectivity is counted and thus partial reflectivity below the threshold may be treated like a non-reflective surface. Also in this example, comparing the interaction with the model of the face may include determining whether the pattern is discernable over the face. For example, a non-reflective human face should not be represented in the sequence of images with an overlay of the pattern, whereas a reflective surface of a device will display such a pattern, such as is illustrated in FIG. 5B.

In an example, a test in the liveness model of tests may include providing a target, without an instruction to the user, on a display. Such a target may provoke the user to move in a particular way, but does not require adherence to a script or other instructed machination to prove liveness. For example, a moving target will likely cause an instinctual response for the user to follow the target with their eyes. Similarly, presenting an outline of a face transposed from the representation of the user's face will likely prompt an attempt by the user to put their face within the outline. In an example, the target is moving. In this example, the test from the set of liveness model tests may include tracking an eye gaze of the user with respect to the target. Also, in this example, the assay is an evaluation of how closely the eye gaze tracks the target. Here, a natural human reaction to a stimulus is used to differentiate between a real face and a facsimile.

In an example, the target is a frame superimposed on the sequence of images re-displayed to the user. Thus, the user sees themselves and an artificial frame in the display. In this example, the test from the set of liveness model tests includes determining a synchronous movement between the user and an environmental feature ascertainable from the sequence of images. Thus, liveness is determined by independence of the face with respect to its surroundings. A facsimile face, for example, will likely have artifacts form the environment that move with it, such as background imagery, device borders, etc. In contrast, a live face will not have such artifacts. Thus, in this example, the assay is an evaluation of how closely movement of the environmental feature is synchronized to movement of the user. The target induces the user to move until enough movement has occurred to determine whether the user is decoupled from the environmental features enough to determine liveness.

In an example, the target may be an icon in a display area including an avatar of the user. In this example, the display area does not include the sequence of images, but rather obfuscates the environment of the authentication. Such obfuscation permits manipulation of the relative motion or position of measurable elements to complicate a spoofing attack. In this example, the test from the set of liveness model tests may include determining a synchronous movement between the user and an environmental feature ascertainable from the sequence of images. Further, the assay may be an evaluation of how closely movement of the environmental feature is synchronized to movement of the user.

In an example, a test in the liveness model of tests may include identifying an outline conforming to a device across the sequence of images. In this example, the assay may be whether the face appears within the outline across a plurality of the sequence of images. Thus, if the face is ensconced in the device outlines throughout the video, it may be determined that the device is generating the face. Accordingly, a live face does not occur within the device edge outline.

At operation 1925, the current face may be added to a set of authentication faces when the result of the set of liveness model tests meets a threshold. In an example, the set of authentication faces may be maintained as a separate data structure, or may be a marking or recording of the faces selected to be authentication faces. In an example, whether the face appears within the outline across the plurality of the sequence of images is true if the face appears in an area of an image in the sequence of images and the outline encloses the area in a set of preceding images in the sequence of images. This provision captures the reality that low-quality lighting or image capture may lead to frames in which the device outline is not discernable but the face is, or vice versa. If a frame occurs in which the device outline is not discernable, but a previous frame had a discernable device outline, the device outline may be inferred in the frame. In an example, the set of preceding images may be selected based on a movement threshold applied to the outline. Thus, a velocity may be calculated for an outline moving across the field of view. If the velocity indicates movement, then a previous outline location would not be used as an inferred device outline when determining if the face appears within the outline. Accordingly, the movement threshold denotes the degree to which the outline is moving in order to ascertain in what area of an image the outline may be inferred.

At operation 1930, a next face in the set of potential authentication faces is selected as the current face for analysis. The operation 1930 may be performed as part of decision 1915, prior to operation 1920, or after operation 1925 as illustrated here.

At operation 1935, after the set of authentication faces is populated, facial authentication may be applied to faces in the set of authentication faces. In an example, the operation 1935 may be performed as each current face is identified as live, instead of waiting until all faces have been processed.

Figure 20:
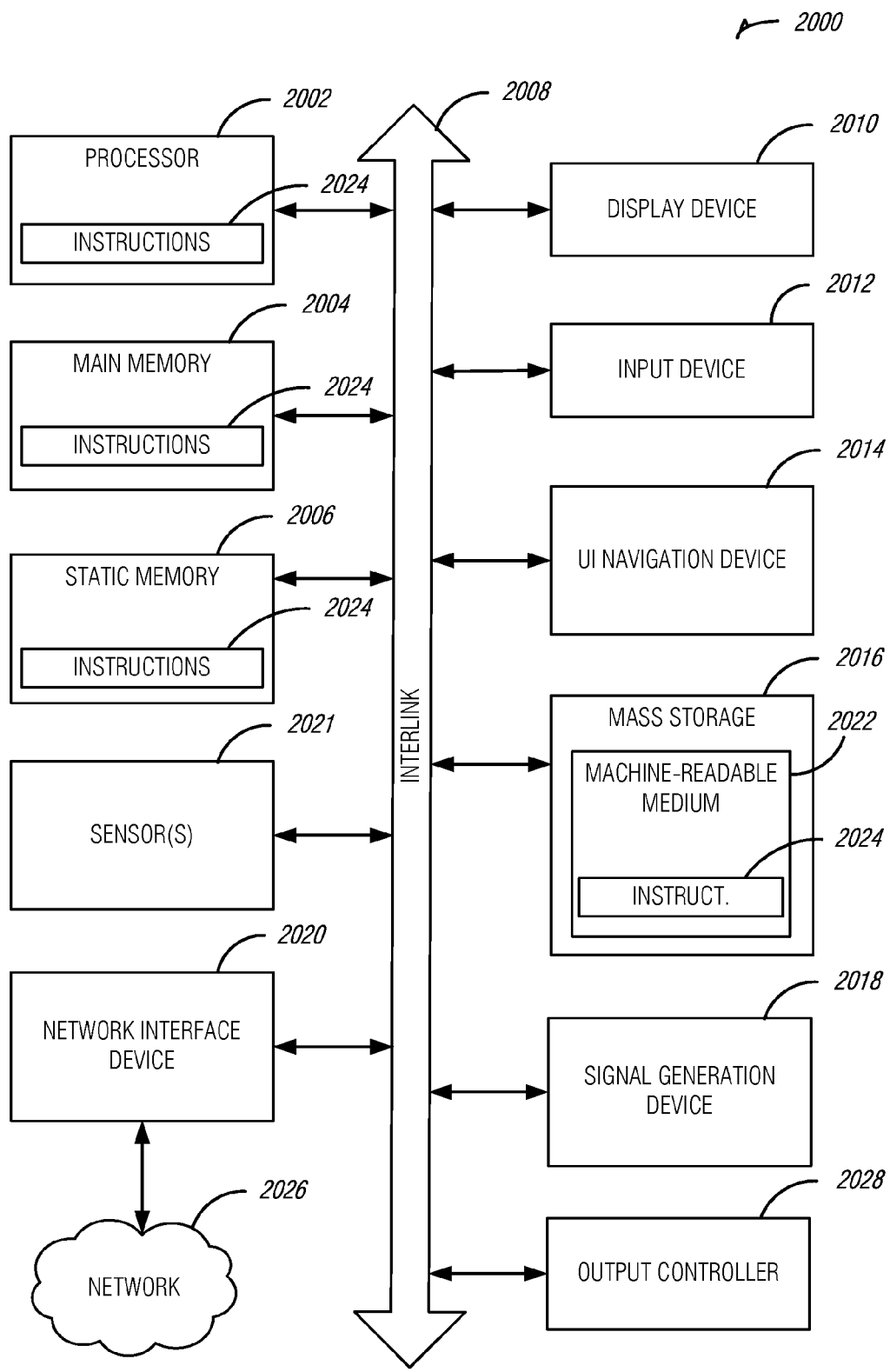
FIG. 20 is a block diagram illustrating an example of a machine upon which one or more embodiments may be implemented.

FIG. 20 illustrates a block diagram of an example machine 2000 upon which any one or more of the techniques (e.g., methodologies) discussed herein may perform. In alternative embodiments, the machine 2000 may operate as a standalone device or may be connected (e.g., networked) to other machines. In a networked deployment, the machine 2000 may operate in the capacity of a server machine, a client machine, or both in server-client network environments. In an example, the machine 2000 may act as a peer machine in peer-to-peer (P2P) (or other distributed) network environment. The machine 2000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 2000 may include a hardware processor 2002 (e.g., a central processing unit (CPU), a graphics processing unit (GPU), a hardware processor core, or any combination thereof), a main memory 2004 and a static memory 2006, some or all of which may communicate with each other via an interlink (e.g., bus) 2008. The machine 2000 may further include a display unit 2010, an alphanumeric input device 2012 (e.g., a keyboard), and a user interface (UI) navigation device 2014 (e.g., a mouse). In an example, the display unit 2010, input device 2012 and UI navigation device 2014 may be a touch screen display. The machine 2000 may additionally include a storage device (e.g., drive unit) 2016, a signal generation device 2018 (e.g., a speaker), a network interface device 2020, and one or more sensors 2021, such as a global positioning system (GPS) sensor, compass, accelerometer, or other sensor. The machine 2000 may include an output controller 2028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2016 may include a machine readable medium 2022 on which is stored one or more sets of data structures or instructions 2024 (e.g., software) embodying or utilized by any one or more of the techniques or functions described herein. The instructions 2024 may also reside, completely or at least partially, within the main memory 2004, within static memory 2006, or within the hardware processor 2002 during execution thereof by the machine 2000. In an example, one or any combination of the hardware processor 2002, the main memory 2004, the static memory 2006, or the storage device 2016 may constitute machine readable media.

While the machine readable medium 2022 is illustrated as a single medium, the term "machine readable medium" may include a single medium or multiple media (e.g., a centralized or distributed database, and/or associated caches and servers) configured to store the one or more instructions 2024.

The term "machine readable medium" may include any medium that is capable of storing, encoding, or carrying instructions for execution by the machine 2000 and that cause the machine 2000 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2024 may further be transmitted or received over a communications network 2026 using a transmission medium via the network interface device 2020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 2020 may include one or more physical jacks (e.g., Ethernet, coaxial, or phone jacks) or one or more antennas to connect to the communications network 2026. In an example, the network interface device 2020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2000, and includes digital or analog communications signals or other intangible medium to facilitate communication of such software.

ADDITIONAL NOTES & EXAMPLES

Example 1 includes subject matter for spoofing detection in image biometrics (such as a method, means for performing acts, machine readable medium including instructions that when performed by a machine cause the machine to performs acts, or an apparatus to perform) comprising: a sensor to obtain a sequences of images, a first plurality of images in the sequence of images including a representation of a user body part, and a second plurality of images in the sequence of images including a representation of an environment of the user, the sensor being a camera; a biometric feature detector to create a marker for the representation of the body part, the marker corresponding to a feature in the representation of the body part; an environmental feature detector to identify a feature of the environment of the user present during the second plurality of images in the sequence of images; a synchronicity detector to quantify a correlation between the marker and the feature of the environment in the sequence of images to produce a synchronicity metric of the degree to which the marker and the feature of the environment correlate; and a spoofing indication controller to provide a spoofing attempt indication in response to the synchronicity metric being beyond a threshold.

In Example 2, the subject matter of Example 1 may include, wherein the body part is a face.

In Example 3, the subject matter of any one of Examples 1 to 2 may include, wherein the system is to process the sequence of images to reduce noise.

In Example 4, the subject matter of any one of Examples 1 to 3 may include, wherein the system is to process the sequence of images to reduce color information.

In Example 5, the subject matter of any one of Examples 1 to 4 may include, wherein the color information is reduced to one bit per pixel.

In Example 6, the subject matter of any one of Examples 1 to 5 may include, wherein the sensor is to capture the sequence of images with a camera as the user approaches the sensor.

In Example 7, the subject matter of any one of Examples 1 to 6 may include, an authentication controller to deny user authentication in response to the spoofing attempt indication.

In Example 8, the subject matter of any one of Examples 1 to 7 may include, wherein to identify the feature of the environment includes an emitter of the system to emit a pattern into the environment.

In Example 9, the subject matter of any one of Examples 1 to 8 may include, wherein to emit the pattern includes the emitter to emit a non-uniform pattern in a visible light spectrum.

In Example 10, the subject matter of any one of Examples 1 to 9 may include, wherein the non-uniform pattern is a moving pattern.

In Example 11, the subject matter of any one of Examples 1 to 10 may include, wherein: the biometric feature detector is to track a gaze of an eye from the representation of the body part; the synchronicity detector is to measure the degree to which the gaze tracks the moving pattern; and the spoofing indication controller is to provide a second spoofing attempt indication in response to the degree to which the gaze tracks the moving pattern meets a predetermined range.

In Example 12, the subject matter of any one of Examples 1 to 11 may include, the system is to perform a calibration session presenting a moving prompt; capturing a second sequence of images during presentation of the moving prompt; measuring a correspondence of user eyelid positions to the moving prompt from the second sequence of images; using the correspondence as the threshold.

In Example 13, the subject matter of any one of Examples 1 to 12 may include, wherein the gaze of the eye is determined by measuring the amount of iris visible for the eye.

In Example 14, the subject matter of any one of Examples 1 to 13 may include, wherein to emit the pattern includes the emitter to emit the pattern in a non-visible light spectrum.

In Example 15, the subject matter of any one of Examples 1 to 14 may include, wherein the feature of the environment is a depth measurement of the body part derived from the pattern, wherein the marker is a measurement of the body part based on the depth measurement and the representation of the body part, wherein the correlation is the degree to which the measurement of the body part conforms to a live body part at the depth measurement.

In Example 16, the subject matter of any one of Examples 1 to 15 may include, wherein the measurement of the body part based on the depth measurement and the representation of the body part is determined by extrapolating the size of the body part using the depth image and a dimension of representation of the body part.

In Example 17, the subject matter of any one of Examples 1 to 16 may include, wherein the measurement of the body part includes a depth map of the body part.

In Example 18, the subject matter of any one of Examples 1 to 17 may include, wherein the feature of the environment includes a reflectivity of the pattern in an area of the environment containing the marker.

In Example 19, the subject matter of any one of Examples 1 to 18 may include, wherein the correlation between the feature of the environment and the marker is the degree to which the area reflects the pattern.

In Example 20, the subject matter of any one of Examples 1 to 19 may include, wherein the threshold defines a minimum reflectivity of the pattern.

In Example 21, the subject matter of any one of Examples 1 to 20 may include, wherein the minimum reflectivity of the pattern includes a minimum reflectivity of a specified feature of the pattern.

In Example 22, the subject matter of any one of Examples 1 to 21 may include, wherein the pattern is moving, and wherein the degree to which the area reflects the patter includes determining whether the specified feature of the pattern moved an expected distance.

In Example 23, the subject matter of any one of Examples 1 to 22 may include, wherein the threshold defines a maximum reflectivity of the pattern.

In Example 24, the subject matter of any one of Examples 1 to 23 may include, wherein to emit the pattern includes the emitter to emit the pattern in a non-visible light spectrum, wherein the degree to which the area reflects the pattern includes the homogeneity of reflection of the non-visible light.

In Example 25, the subject matter of any one of Examples 1 to 24 may include, wherein the degree to which the area reflects the pattern includes a brightness of the reflection of non-visible light, a bright reflection corresponding to a high reflectivity.

In Example 26, the subject matter of any one of Examples 1 to 25 may include, wherein the feature of the environment includes a convex hull of points on edges detected in the plurality of the images.

In Example 27, the subject matter of any one of Examples 1 to 26 may include, wherein the edges are compared to a catalog of device edge configurations to determine whether the edges represent a known device, and wherein the convex hull of points is based on a physical configuration of the known device.

In Example 28, the subject matter of any one of Examples 1 to 27 may include, wherein the edges are moving edges.

In Example 29, the subject matter of any one of Examples 1 to 28 may include, wherein the correlation between the marker and the feature of the environment is the degree to which marker is found within the convex hull.

In Example 30, the subject matter of any one of Examples 1 to 29 may include, wherein the marker is a line between eyes in the representation of the body part.

In Example 31, the subject matter of any one of Examples 1 to 30 may include, wherein the feature of the environment is a background proximate to the body part, and wherein the correlation is the degree to which the background proximate to the body part moves with the marker.

In Example 32, the subject matter of any one of Examples 1 to 31 may include, a display, and wherein the system is to display, on the display, a target and the representation of the body part to the user, the target being in a different position than the representation of the body part.

In Example 33, the subject matter of any one of Examples 1 to 32 may include, wherein the target is an outline of a shape sized such that the representation of the body part fits inside the shape when a center of the shape coincides with a center of the representation of the body part.

In Example 34, the subject matter of any one of Examples 1 to 33 may include, wherein the shape is a rectangle.

In Example 35, the subject matter of any one of Examples 1 to 34 may include, wherein the target is a shape sized such that the representation of the body part does not fit inside the shape when a center of the shape coincides with a center of the representation of the body part.

In Example 36, the subject matter of any one of Examples 1 to 35 may include, wherein the target being in a different position than the representation of the body part includes displaying the target at an offset from the body part, the offset determined by a relative motion model defining a motion parameter of the body part to distinguish between foreground objects and background objects in a field of view of the sensor capturing the sequence of images.

In Example 37, the subject matter of any one of Examples 1 to 36 may include, wherein the body part is a face, and wherein the direction of the offset is the inverse of an orientation of the face.

In Example 38, the subject matter of any one of Examples 1 to 37 may include, wherein the distance of the offset from the representation of the body part is not coupled to a pixel position difference between the body part captured in the sequence of images and the target.

In Example 39, the subject matter of any one of Examples 1 to 38 may include, wherein the relative motion model includes a threshold of movement sufficient to distinguish foreground objects from background objects.

In Example 40, the subject matter of any one of Examples 1 to 39 may include, wherein to display the representation of the body part includes the system to modify the motion of the body part using the relative motion model, speeding up or slowing down the movement at various points throughout the moving.

In Example 41, the subject matter of any one of Examples 1 to 40 may include, wherein the spoofing attempt indication is made prior to the representation of the body part reaching the target.

In Example 42, the subject matter of any one of Examples 1 to 41 may include, wherein the representation of the body part is symbol obfuscating at least one feature of the body part from the sequence of images.

In Example 43, the subject matter of any one of Examples 1 to 42 may include, wherein the symbol is an illustration of the body part.

In Example 44, the subject matter of any one of Examples 1 to 43 may include, wherein the environmental feature is a model of an eye blinking sequence, wherein the marker is a measured eye blinking sequence, and wherein the correlation is the degree to which the measured eye blinking sequence conforms to the model.

In Example 45, the subject matter of any one of Examples 1 to 44 may include, wherein the measured eye blinking sequence is determined by the biometric feature detector, the biometric feature detector to: extract, from each image in the sequence of images in which an eye of the user is detected, a respective region of interest corresponding to each eye of the user, the respective region of interest including an eyelid; and calculate, for each respective region of interest, a respective score corresponding to a percentage of the eye unobstructed by the eyelid to create a series of respective scores; and wherein the degree to which the measured eye blinking sequence conforms to the model is determined by processing, through a pattern recognizer, the series of respective scores, the pattern recognizer checking the series of respective scores for at least one of an abnormal eyelid sequence or an abnormal blink sequence based on the model.

In Example 46, the subject matter of any one of Examples 1 to 45 may include, wherein the pattern recognizer serially checks the abnormal blink sequence after verifying that the eyelid sequence is normal.

In Example 47, the subject matter of any one of Examples 1 to 46 may include, wherein the model defines an eyelid sequence corresponding to eyelids that move in opposite directions as an abnormal eyelid sequence.

Example 48 includes subject matter for spoofing detection in image biometrics (such as a method, means for performing acts, machine readable medium including instructions that when performed by a machine cause the machine to performs acts, or an apparatus to perform) comprising: obtaining a sequences of images from a camera using a first group of circuits, a first plurality of images in the sequence of images including a representation of a user body part, and a second plurality of images in the sequence of images including a representation of an environment of the user; creating a marker for the representation of the body part using a second group of circuits, the marker corresponding to a feature in the representation of the body part; identifying a feature of the environment of the user present during the second plurality of images in the sequence of images using a third group of circuits; quantifying, using a third group of circuits, a correlation between the marker and the feature of the environment in the sequence of images to produce a synchronicity metric of the degree to which the marker and the feature of the environment correlate; and providing, using a fourth group of circuits, a spoofing attempt indication in response to the synchronicity metric being beyond a threshold.

In Example 49, the subject matter of Example 48 may include, wherein the body part is a face.

In Example 50, the subject matter of any one of Examples 48 to 49 may include, processing the sequence of images to reduce noise.

In Example 51, the subject matter of any one of Examples 48 to 50 may include, processing the sequence of images to reduce color information.

In Example 52, the subject matter of any one of Examples 48 to 51 may include, wherein the color information is reduced to one bit per pixel.

In Example 53, the subject matter of any one of Examples 48 to 52 may include, capturing the sequence of images with a camera as the user approaches the camera.

In Example 54, the subject matter of any one of Examples 48 to 53 may include, denying user authentication in response to the spoofing attempt indication.

In Example 55, the subject matter of any one of Examples 48 to 54 may include, wherein identifying the feature of the environment includes emitting a pattern into the environment.

In Example 56, the subject matter of any one of Examples 48 to 55 may include, wherein emitting the pattern includes emitting a non-uniform pattern in a visible light spectrum.

In Example 57, the subject matter of any one of Examples 48 to 56 may include, wherein the non-uniform pattern is a moving pattern.

In Example 58, the subject matter of any one of Examples 48 to 57 may include, tracking a gaze of an eye from the representation of the body part; measuring the degree to which the gaze tracks the moving pattern; and providing a second spoofing attempt indication in response to the degree to which the gaze tracks the moving pattern meets a predetermined range.

In Example 59, the subject matter of any one of Examples 48 to 58 may include, a calibration session presenting a moving prompt; capturing a second sequence of images during presentation of the moving prompt; measuring a correspondence of user eyelid positions to the moving prompt from the second sequence of images; using the correspondence as the threshold.

In Example 60, the subject matter of any one of Examples 48 to 59 may include, wherein the gaze of the eye is determined by measuring the amount of iris visible for the eye.

In Example 61, the subject matter of any one of Examples 48 to 60 may include, wherein emitting the pattern includes emitting the pattern in a non-visible light spectrum.

In Example 62, the subject matter of any one of Examples 48 to 61 may include, wherein the feature of the environment is a depth measurement of the body part derived from the pattern, wherein the marker is a measurement of the body part based on the depth measurement and the representation of the body part, wherein the correlation is the degree to which the measurement of the body part conforms to a live body part at the depth measurement.

In Example 63, the subject matter of any one of Examples 48 to 62 may include, wherein the measurement of the body part based on the depth measurement and the representation of the body part is determined by extrapolating the size of the body part using the depth image and a dimension of representation of the body part.

In Example 64, the subject matter of any one of Examples 48 to 63 may include, wherein the measurement of the body part includes a depth map of the body part.

In Example 65, the subject matter of any one of Examples 48 to 64 may include, wherein the feature of the environment includes a reflectivity of the pattern in an area of the environment containing the marker.

In Example 66, the subject matter of any one of Examples 48 to 65 may include, wherein the correlation between the feature of the environment and the marker is the degree to which the area reflects the pattern.

In Example 67, the subject matter of any one of Examples 48 to 66 may include, wherein the threshold defines a minimum reflectivity of the pattern.

In Example 68, the subject matter of any one of Examples 48 to 67 may include, wherein the minimum reflectivity of the pattern includes a minimum reflectivity of a specified feature of the pattern.

In Example 69, the subject matter of any one of Examples 48 to 68 may include, wherein the pattern is moving, and wherein the degree to which the area reflects the patter includes determining whether the specified feature of the pattern moved an expected distance.

In Example 70, the subject matter of any one of Examples 48 to 69 may include, wherein the threshold defines a maximum reflectivity of the pattern.

In Example 71, the subject matter of any one of Examples 48 to 70 may include, wherein emitting the pattern includes emitting the pattern in a non-visible light spectrum, wherein the degree to which the area reflects the pattern includes the homogeneity of reflection of the non-visible light.

In Example 72, the subject matter of any one of Examples 48 to 71 may include, wherein the degree to which the area reflects the pattern includes a brightness of the reflection of non-visible light, a bright reflection corresponding to a high reflectivity.

In Example 73, the subject matter of any one of Examples 48 to 72 may include, wherein the feature of the environment includes a convex hull of points on edges detected in the plurality of the images.

In Example 74, the subject matter of any one of Examples 48 to 73 may include, wherein the edges are compared to a catalog of device edge configurations to determine whether the edges represent a known device, and wherein the convex hull of points is based on a physical configuration of the known device.

In Example 75, the subject matter of any one of Examples 48 to 74 may include, wherein the edges are moving edges.

In Example 76, the subject matter of any one of Examples 48 to 75 may include, wherein the correlation between the marker and the feature of the environment is the degree to which marker is found within the convex hull.

In Example 77, the subject matter of any one of Examples 48 to 76 may include, wherein the marker is a line between eyes in the representation of the body part.

In Example 78, the subject matter of any one of Examples 48 to 77 may include, wherein the feature of the environment is a background proximate to the body part, and wherein the correlation is the degree to which the background proximate to the body part moves with the marker.

In Example 79, the subject matter of any one of Examples 48 to 78 may include, displaying a target and the representation of the body part to the user, the target being in a different position than the representation of the body part.

In Example 80, the subject matter of any one of Examples 48 to 79 may include, wherein the target is an outline of a shape sized such that the representation of the body part fits inside the shape when a center of the shape coincides with a center of the representation of the body part.

In Example 81, the subject matter of any one of Examples 48 to 80 may include, wherein the shape is a rectangle.

In Example 82, the subject matter of any one of Examples 48 to 81 may include, wherein the target is a shape sized such that the representation of the body part does not fit inside the shape when a center of the shape coincides with a center of the representation of the body part.

In Example 83, the subject matter of any one of Examples 48 to 82 may include, wherein the target being in a different position than the representation of the body part includes displaying the target at an offset from the body part, the offset determined by a relative motion model defining a motion parameter of the body part to distinguish between foreground objects and background objects in a field of view of a camera capturing the sequence of images.

In Example 84, the subject matter of any one of Examples 48 to 83 may include, wherein the body part is a face, and wherein the direction of the offset is the inverse of an orientation of the face.

In Example 85, the subject matter of any one of Examples 48 to 84 may include, wherein the distance of the offset from the representation of the body part is not coupled to a pixel position difference between the body part captured in the sequence of images and the target.

In Example 86, the subject matter of any one of Examples 48 to 85 may include, wherein the relative motion model includes a threshold of movement sufficient to distinguish foreground objects from background objects.

In Example 87, the subject matter of any one of Examples 48 to 86 may include, wherein displaying the representation of the body part includes modifying the motion of the body part using the relative motion model, speeding up or slowing down the movement at various points throughout the moving.

In Example 88, the subject matter of any one of Examples 48 to 87 may include, wherein the spoofing attempt indication is made prior to the representation of the body part reaching the target.

In Example 89, the subject matter of any one of Examples 48 to 88 may include, wherein the representation of the body part is symbol obfuscating at least one feature of the body part from the sequence of images.

In Example 90, the subject matter of any one of Examples 48 to 89 may include, wherein the symbol is an illustration of the body part.

In Example 91, the subject matter of any one of Examples 48 to 90 may include, wherein the environmental feature is a model of an eye blinking sequence, wherein the marker is a measured eye blinking sequence, and wherein the correlation is the degree to which the measured eye blinking sequence conforms to the model.

In Example 92, the subject matter of any one of Examples 48 to 91 may include, wherein the measured eye blinking sequence is determined by: extracting, from each image in the sequence of images in which an eye of the user is detected, a respective region of interest corresponding to each eye of the user, the respective region of interest including an eyelid; and calculating, for each respective region of interest, a respective score corresponding to a percentage of the eye unobstructed by the eyelid to create a series of respective scores; and wherein the degree to which the measured eye blinking sequence conforms to the model is determined by processing, through a pattern recognizer, the series of respective scores, the pattern recognizer checking the series of respective scores for at least one of an abnormal eyelid sequence or an abnormal blink sequence based on the model.

In Example 93, the subject matter of any one of Examples 48 to 92 may include, wherein the pattern recognizer serially checks the abnormal blink sequence after verifying that the eyelid sequence is normal.

In Example 94, the subject matter of any one of Examples 48 to 93 may include, wherein the model defines an eyelid sequence corresponding to eyelids that move in opposite directions as an abnormal eyelid sequence.

Example 97 includes subject matter for facial liveness detection in image biometrics (such as a device, apparatus, or machine) comprising: a biometric feature detector to detect a set of potential authentication faces in an images sequence captured during an authentication attempt by a user; a liveness indication controller to: for each face in the set of potential authentication faces: invoke a synchronicity detector to apply a set of liveness model tests to the face, each test in the set of liveness tests including an assay that differs between a live face and a face simulated on a pictorial representation of a face, the assay operating independently of body arrangement instructions given to the user; and add the face to a set of authentication faces when the result of the set of liveness model tests meets a threshold; and an authentication controller to apply facial authentication to faces in the set of authentication faces.

In Example 98, the subject matter of Example 97 may include, wherein a test in the liveness model of tests includes: an emitter of the system to emit light towards the face; a sensor of the system to measure an interaction of the light with the face; and the synchronicity detector to compare the interaction with a model of a live face.

In Example 99, the subject matter of any one of Examples 97 to 98 may include, wherein the interaction of the light with the face provides a distance measurement between the face and the emitter, wherein the model of the live face includes an acceptable size range of a live face, and wherein to compare the interaction with the model includes the synchronicity detector to scale a visual light spectrum representation of the face acquired from the images sequence using the distance measurement to determine whether the face is within the acceptable size range of a live face.

In Example 100, the subject matter of any one of Examples 97 to 99 may include, wherein the interaction of the light with the face is a reflectivity measurement of the character of the light reflected from the face.

In Example 101, the subject matter of any one of Examples 97 to 100 may include, wherein to emit the light includes the emitter to emit non-visual spectrum light, wherein the model of a live face includes a non-uniform positive reflectivity of the light, and wherein to compare the interaction with the model of the face includes the synchronicity detector to determine whether the area in which the face was found has non-uniform positive reflectivity in the non-visual spectrum light.

In Example 102, the subject matter of any one of Examples 97 to 101 may include, wherein the non-visual spectrum light is infrared light.

In Example 103, the subject matter of any one of Examples 97 to 102 may include, wherein to emit the light include the emitter to emit a non-uniform pattern of visible light, wherein the model of a live face does not reflect the pattern, and wherein to compare the interaction with the model of the face includes the synchronicity detector to determine whether the pattern is discernable over the face.

In Example 104, the subject matter of any one of Examples 97 to 103 may include, wherein a test in the liveness model of tests includes providing a target, without an instruction to the user, on a display.

In Example 105, the subject matter of any one of Examples 97 to 58 may include, wherein the target is moving, wherein the test from the set of liveness model tests includes the biometric feature detector to track an eye gaze of the user with respect to the target, and wherein the assay is an evaluation of how closely the eye gaze tracks the target.

In Example 106, the subject matter of any one of Examples 97 to 105 may include, wherein the target is a frame superimposed on the sequence of images re-displayed to the user via a display of the system, wherein the test from the set of liveness model tests includes the synchronicity detector to determine a synchronous movement between the user and an environmental feature ascertainable from the sequence of images, and wherein the assay is an evaluation of how closely movement of the environmental feature is synchronized to movement of the user.

In Example 107, the subject matter of any one of Examples 97 to 106 may include, wherein the target is an icon in a display area an avatar of the user, the display area not the sequence of images by an environmental feature detector, wherein the test from the set of liveness model tests includes the synchronicity detector to determine a synchronous movement between the user and an environmental feature ascertainable from the sequence of images, and wherein the assay is an evaluation of how closely movement of the environmental feature is synchronized to movement of the user.

In Example 108, the subject matter of any one of Examples 97 to 107 may include, wherein a test in the liveness model of tests includes the environmental feature detector identifying an outline conforming to a device across the sequence of images, and wherein the assay is whether the face appears within the outline across a plurality of the sequence of images.

In Example 109, the subject matter of any one of Examples 97 to 108 may include, wherein whether the face appears within the outline across the plurality of the sequence of images is true if the face appears in an area of an image in the sequence of images and the outline encloses the area in a set of preceding images in the sequence of images, the set of preceding images selected based on a movement threshold applied to the outline.

Example 110 includes subject matter for facial liveness detection in image biometrics (such as a method, means for performing acts, machine readable medium including instructions that when performed by a machine cause the machine to performs acts, or an apparatus to perform) comprising: detecting a set of potential authentication faces in an images sequence captured during an authentication attempt by a user; for each face in the set of potential authentication faces, perform the operations of: applying a set of liveness model tests to the face, each test in the set of liveness tests including an assay that differs between a live face and a face simulated on a pictorial representation of a face, the assay operating independently of body arrangement instructions given to the user; and adding the face to a set of authentication faces when the result of the set of liveness model tests meets a threshold; and applying facial authentication to faces in the set of authentication faces.

In Example 111, the subject matter of Example 110 may include, wherein a test in the liveness model of tests includes: emitting light towards the face with an emitter; measuring an interaction of the light with the face; and comparing the interaction with a model of a live face.

In Example 112, the subject matter of any one of Examples 110 to 111 may include, wherein the interaction of the light with the face provides a distance measurement between the face and the emitter, wherein the model of the live face includes an acceptable size range of a live face, and wherein comparing the interaction with the model includes scaling a visual light spectrum representation of the face acquired from the images sequence using the distance measurement to determine whether the face is within the acceptable size range of a live face.

In Example 113, the subject matter of any one of Examples 110 to 112 may include, wherein the interaction of the light with the face is a reflectivity measurement of the character of the light reflected from the face.

In Example 114, the subject matter of any one of Examples 110 to 113 may include, wherein emitting the light includes emitting non-visual spectrum light, wherein the model of a live face includes a non-uniform positive reflectivity of the light, and wherein comparing the interaction with the model of the face includes determining whether the area in which the face was found has non-uniform positive reflectivity in the non-visual spectrum light.

In Example 115, the subject matter of any one of Examples 110 to 114 may include, wherein the non-visual spectrum light is infrared light.

In Example 116, the subject matter of any one of Examples 110 to 115 may include, wherein emitting the light include emitting a non-uniform pattern of visible light, wherein the model of a live face does not reflect the pattern, and wherein comparing the interaction with the model of the face includes determining whether the pattern is discernable over the face.

In Example 117, the subject matter of any one of Examples 110 to 116 may include, wherein a test in the liveness model of tests includes providing a target, without an instruction to the user, on a display.

In Example 118, the subject matter of any one of Examples 110 to 117 may include, wherein the target is moving, wherein the test from the set of liveness model tests includes tracking an eye gaze of the user with respect to the target, and wherein the assay is an evaluation of how closely the eye gaze tracks the target.

In Example 119, the subject matter of any one of Examples 110 to 118 may include, wherein the target is a frame superimposed on the sequence of images re-displayed to the user, wherein the test from the set of liveness model tests includes determining a synchronous movement between the user and an environmental feature ascertainable from the sequence of images, and wherein the assay is an evaluation of how closely movement of the environmental feature is synchronized to movement of the user.

In Example 120, the subject matter of any one of Examples 110 to 119 may include, wherein the target is an icon in a display area an avatar of the user, the display area not the sequence of images, wherein the test from the set of liveness model tests includes determining a synchronous movement between the user and an environmental feature ascertainable from the sequence of images, and wherein the assay is an evaluation of how closely movement of the environmental feature is synchronized to movement of the user.

In Example 121, the subject matter of any one of Examples 110 to 120 may include, wherein a test in the liveness model of tests includes identifying an outline conforming to a device across the sequence of images, and wherein the assay is whether the face appears within the outline across a plurality of the sequence of images.

In Example 122, the subject matter of any one of Examples 110 to 121 may include, wherein whether the face appears within the outline across the plurality of the sequence of images is true if the face appears in an area of an image in the sequence of images and the outline encloses the area in a set of preceding images in the sequence of images, the set of preceding images selected based on a movement threshold applied to the outline.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for spoofing detection in image biometrics, the method comprising:
    a camera to obtain a sequences of images, a first plurality of images in the sequence of images including a representation of a user body part, and a second plurality of images in the sequence of images including a representation of an environment of the user, the sensor being a camera, the environment being a three-dimensional space that is within a field of view of the camera;
    a biometric feature detector to create a marker for the representation of the body part, the marker corresponding to a feature in the representation of the body part;
    an environmental feature detector to identify a feature of the environment of the user present during second plurality of images in the sequence of images, wherein to identify the feature of the environment includes an emitter of the system to emit a pattern into the environment, the pattern comprising a first component in a visible light spectrum and a second component in an infrared light spectrum, wherein the feature of the environment includes a reflectivity of the pattern, including the first component and the second component, in an area of the environment containing the marker;
    a synchronicity detector to quantify a correlation between the marker and the feature of the environment in the sequence of images to produce a synchronicity metric of the degree to which the marker and the feature of the environment correlate, wherein the correlation between the marker and the feature of the environment includes a degree to which the reflectivity of the pattern in the first component in the visible light spectrum and the second component in the infrared list spectrum differ from each other; and
    a spoofing indication controller to provide a spoofing attempt indication in response to the synchronicity metric being beyond a threshold, wherein the threshold is based on a reflectivity divergence such that divergent reflectivity between infrared and visible light with infrared being lower indicates a spoofing attempt and divergent reflectivity between infrared and visible light with visible light being lower indicates liveness.

2. The system of claim 1, wherein to emit the pattern includes the emitter to emit a non-uniform pattern in the visible light spectrum.

3. The system of claim 2, wherein the non-uniform pattern is a moving pattern.

4. The system of claim 1, wherein the feature of the environment includes a depth measurement of the body part derived from the pattern, wherein the marker includes a measurement of the body part based on the depth measurement and the representation of the body part, and wherein the correlation includes the degree to which the measurement of the body part conforms to a live body part at the depth measurement.

5. The system of claim 4, wherein the measurement of the body part based on the depth measurement and the representation of the body part is determined by extrapolating the size of the body part using the depth image and a dimension of representation of the body part.

6. The system of claim 1, wherein the correlation between the feature of the environment and the marker includes the degree to which the area reflects the pattern.

7. The system of claim 6, wherein the threshold defines a minimum reflectivity of the pattern.

8. The system of claim 6, wherein the threshold defines a maximum reflectivity of the pattern.

9. The system of claim 6, wherein the degree to which the area reflects the pattern includes the homogeneity of reflection of the non-visible light.

10. A method for spoofing detection in image biometrics, the method comprising:
obtaining a sequences of images from a camera using computer hardware, a first plurality of images in the sequence of images including a representation of a user body part, and a second plurality of images in the sequence of images including a representation of an environment of the user, the environment being a three-dimensional space that is within a field of view of the camera;
creating a marker for the representation of the body part using the computer hardware, the marker corresponding to a feature in the representation of the body part;
identifying a feature of the environment of the user present during the second plurality of images in the sequence of images using the computer hardware, wherein identifying the feature of the environment includes an emitter of the system to emit a pattern into the environment, the pattern comprising a first component in a visible light spectrum and a second component in an infrared light spectrum, wherein the feature of the environment includes a reflectivity of the pattern, including the first component and the second component, in an area of the environment containing the marker;
quantifying, using the computer hardware, a correlation between the marker and the feature of the environment in the sequence of images to produce a synchronicity metric of the degree to which the marker and the feature of the environment correlate, wherein the correlation between the marker and the feature of the environment includes a degree to which the reflectivity of the pattern in the first component in the visible light spectrum and the second component in the infrared list spectrum differ from each other; and
providing, using the computer hardware, a spoofing attempt indication in response to the synchronicity metric being beyond a threshold, wherein the threshold is based on a reflectivity divergence such that divergent reflectivity between infrared and visible light with infrared being lower indicates a spoofing attempt and divergent reflectivity between infrared and visible light with visible light being lower indicates liveness.

11. The method of claim 10, wherein the correlation between the feature of the environment and the marker is the degree to which the area reflects the pattern.

12. The method of claim 11, wherein the threshold defines a minimum reflectivity of the pattern.

13. The method of claim 11, wherein the threshold defines a maximum reflectivity of the pattern.

14. The method of claim 10, wherein the feature of the environment includes a background proximate to the body part, and wherein the correlation includes the degree to which the background proximate to the body part moves with the marker.

15. The method of claim 10, comprising displaying a target and the representation of the body part to the user, the target being in a different position than the representation of the body part.

16. The method of claim 15, wherein the target being in a different position than the representation of the body part includes displaying the target at an offset from the body part, the offset determined by a relative motion model defining a motion parameter of the body part to distinguish between foreground objects and background objects in a field of view of a camera capturing the sequence of images.

17. The method of claim 10, wherein the feature of the environment includes a model of an eye blinking sequence, wherein the marker is a measured eye blinking sequence, and wherein the correlation is the degree to which the measured eye blinking sequence conforms to the model.

18. The method of claim 17, wherein the measured eye blinking sequence is determined by:
extracting, from each image in the sequence of images in which an eye of the user is detected, a respective region of interest corresponding to each eye of the user, the respective region of interest including an eyelid; and
calculating, for each respective region of interest, a respective score corresponding to a percentage of the eye unobstructed by the eyelid ate a series of respective scores; and
wherein the degree to which the measured eye blinking sequence conforms to the model is determined by processing, through a pattern recognizer, the series of respective scores, the pattern recognizer checking the series of respective scores for at least one of an abnormal eyelid sequence or an abnormal blink sequence based on the model.

* * * * *

UNITED STATES PATENT AND TRADEMARK OFFICE
CERTIFICATE OF CORRECTION

PATENT NO. : 9,875,396 B2
APPLICATION NO. : 14/779546
DATED : January 23, 2018
INVENTOR(S) : Negi et al.

It is certified that error appears in the above-identified patent and that said Letters Patent is hereby corrected as shown below:

On the Title Page

On page 2, in Column 2, item (56), under "Other Publications", Line 15, after "PCT/US2015/060392", insert --,--

In the Claims

In Column 36, Line 34, in Claim 1, after "during", insert --the--

In Column 38, Line 47, in Claim 18, delete "ate" and insert --to create-- therefor Signed and Sealed this
Sixteenth Day of July, 2019

Andrei Iancu
*Director of the United States Patent and Trademark Office*